United States Patent
Kosugi et al.

(10) Patent No.: US 7,974,666 B2
(45) Date of Patent: Jul. 5, 2011

(54) OPENING/CLOSING DEVICE AND MOBILE DEVICE USING THE SAME

(75) Inventors: Satoshi Kosugi, Kanagawa (JP); Makoto Doi, Ishikawa (JP)

(73) Assignee: Panasonic Corporation, Osaka (JP)

( * ) Notice: Subject to any disclaimer, the term of this patent is extended or adjusted under 35 U.S.C. 154(b) by 509 days.

(21) Appl. No.: 12/096,914

(22) PCT Filed: Dec. 13, 2005

(86) PCT No.: PCT/JP2005/022861
§ 371 (c)(1), (2), (4) Date: Jun. 11, 2008

(87) PCT Pub. No.: WO2007/069300
PCT Pub. Date: Jun. 21, 2007

(65) Prior Publication Data
US 2009/0280874 A1    Nov. 12, 2009

(51) Int. Cl.
*H04M 1/00* (2006.01)

(52) U.S. Cl. ............ 455/575.3; 455/575.4; 16/328; 361/755; 379/433.13

(58) Field of Classification Search .......... 455/575.1, 455/575.3, 575.4; 16/312, 327, 328; 361/752, 361/755; 379/433.11–433.13
See application file for complete search history.

(56) References Cited

U.S. PATENT DOCUMENTS

| 5,636,275 A * | 6/1997 | Takagi et al. ............ 379/433.13 |
| 7,054,073 B2 * | 5/2006 | Shirie ............................ 359/699 |
| 7,184,275 B2 * | 2/2007 | Yamaguchi et al. .......... 361/755 |
| 2003/0058773 A1 * | 3/2003 | Kabasawa .................. 369/77.1 |

FOREIGN PATENT DOCUMENTS
JP    2003-232336 A    8/2003

* cited by examiner

*Primary Examiner* — Nhan Le
(74) *Attorney, Agent, or Firm* — Pearne & Gordon LLP

(57) ABSTRACT

It is an object of the present invention to provide an opening/closing hinge device which can be produced simple in construction and inexpensive in production by reducing the number of the parts forming part of the mobile device and to provide a mobile device small in size, reduced in cost and sufficiently reliable in the hinged members. The second member is rotated with respect to the first member toward the opening operation direction through the movable cam (150) by the urging force of the urging means (170) when the operation cam (130) is displaced in the predetermined operation direction by the external operation force. The fixed guide member (110) has inclined guide portions (115) each inclined at an advance angle in a predetermined inclination direction with respect to the surface perpendicular to the guide center axis to have the second rotation cam (140) rotated around the guide center axis in response to the displacement of the second rotation cam (140) along the guide center axis. The second rotation cam (140) being driven to rotate by the inclined guide portions (115) under a pressing force from the movable cam (150) to have its engagement state with the movable cam (150) changed and to have the urging direction of the second member by the urging means (170) changed when the operation cam (130) is operated to cause the first rotation cam (160) to be rotated from the operation starting position.

10 Claims, 18 Drawing Sheets

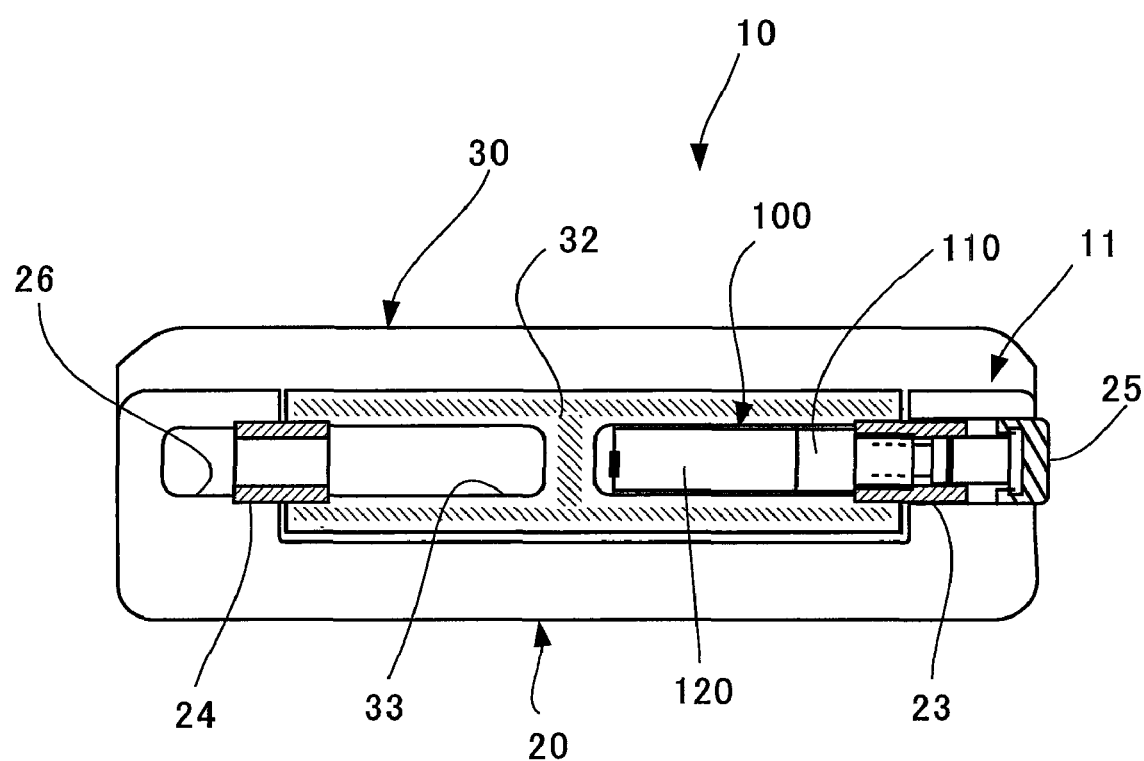

Start of Manual Opening Operation

Inversion of Operation Force

Transferred to another Cam

Psitioned at its Opened State

Start of Push Button Operation

Changed to the other of Urging Directions

Transferred to another Cam

Positioned at its Opened Position

FIG. 17(a) Start of Push Button Operation
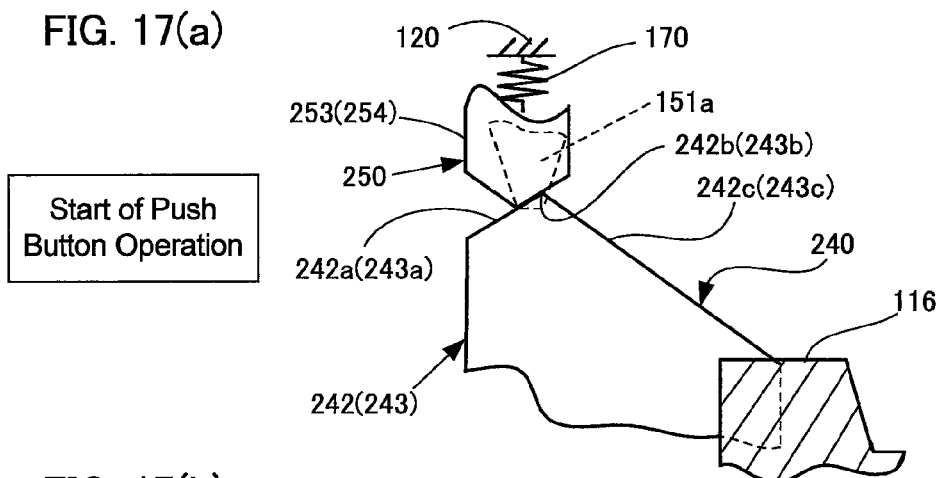
FIG. 17(b) Changed to the other of Urging Directions
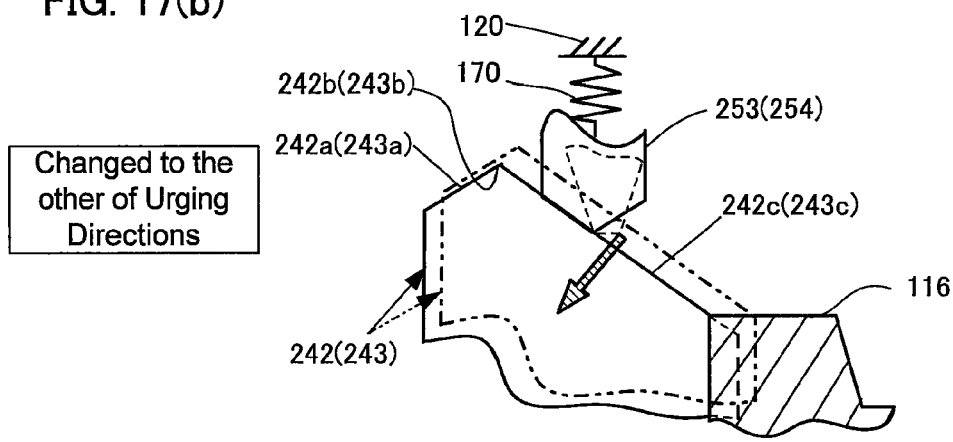
FIG. 17(c) Transferred to another Cam
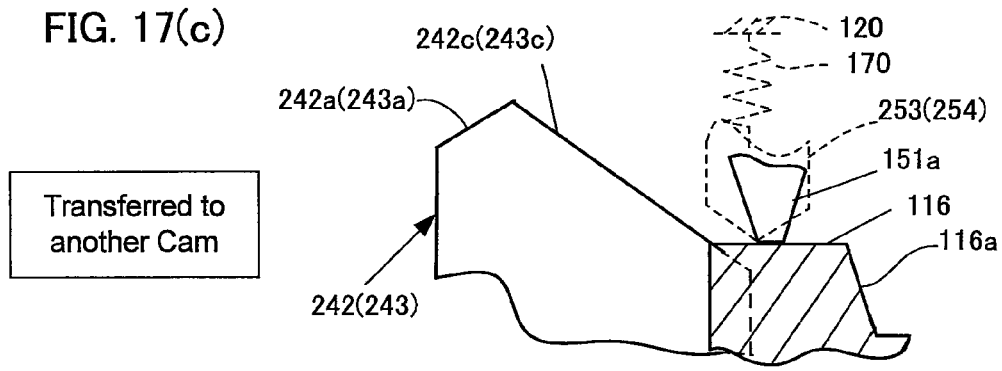
FIG. 17(d) Positioned at its Opened Position
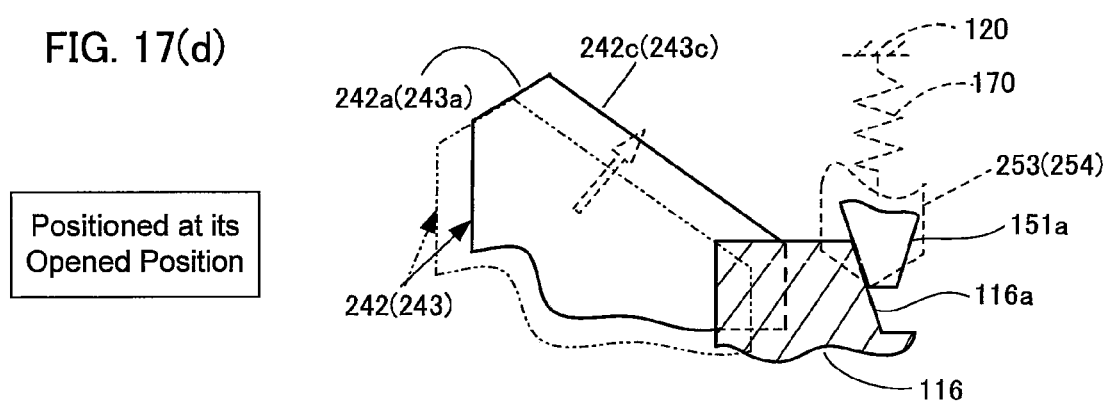

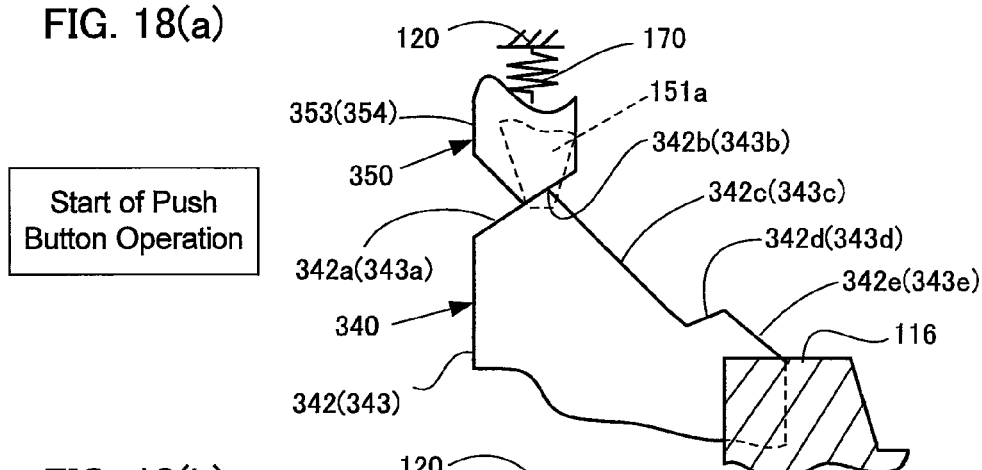
FIG. 18(a) Start of Push Button Operation
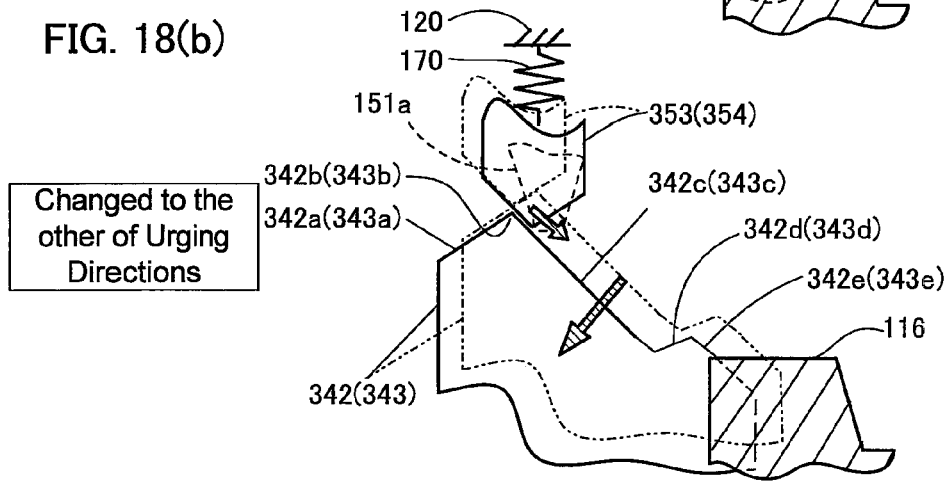
FIG. 18(b) Changed to the other of Urging Directions
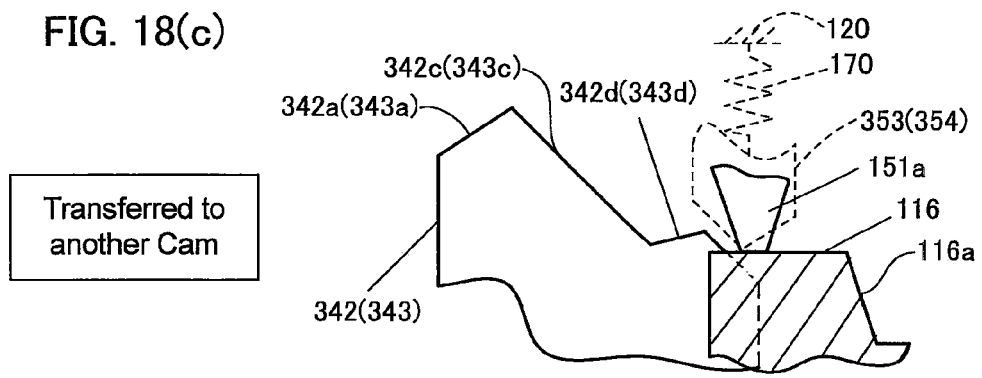
FIG. 18(c) Transferred to another Cam
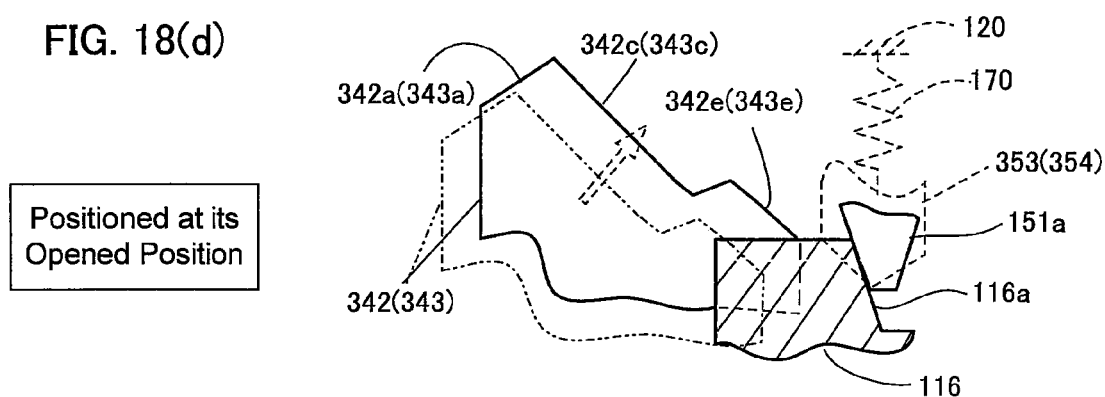
FIG. 18(d) Positioned at its Opened Position

OPENING/CLOSING DEVICE AND MOBILE DEVICE USING THE SAME

TECHNICAL FIELD

The present invention relates to an opening/closing device and a mobile device using the same, and in particular to an opening/closing device provided with a function to have a foldable type of hinge connection body having one and the other members hinged together operated into an opened state with a simple pushing operation of a pushing button.

BACKGROUND OF TECHNOLOGY

As one of conventional mobile devices represented by mobile phones, PDA (Personal Digital Assistance) and the like, those mobile devices having a housing of a foldable type small in size, light in weight and excellent in protective function are widely used. The mobile device of this kind is difficult to manipulate the opening operation of the housing forming part of the mobile device as the housing becomes small in size. In the recent years, there has been proposed a mobile device which is excellent in the manipulation of the opening operation of the housing by providing the mobile device with an opening/closing device to ensure that the opening/closing operation of the mobile device is carried out simply by the pushing operation of the push button provided in the one hinged member of the housing of the mobile device.

As the opening/closing device of this kind, there has been widely known a mobile device (for example see following patent document 1) which comprises a plurality of rotation cams including a conversion cam for converting the pushing operation to the rotation motion when the pushing button is pushed, a release cam driven by the conversion cam and a returning spring, a fixed cam and a reversing cam to be operated by the release cam, the above cams being provided in a cylindrical guide member fixed to one hinged member to be hinged with the other hinged member. In response to the pushing operation of the pushing button, the engaging state between the rotation cam and the movable cam fixed to the housing and thus moved together with the housing is changed to make it possible for the opening/closing device to be opened and closed by using the urging force of the spring.
Patent document 1: Patent laying open publication 2003-232336

DISCLOSURE OF THE INVENTION

Problem to be Solved by the Invention

Many problems are encountered in that the conventional opening/closing device is complex in structure, difficult in making the device small in size, and expensive in production cost by the reason that the conventional opening/closing device is constituted by many kinds of rotation cams such as a fixed cam for maintaining and fixing the housing in a closed state, a releasing cam for releasing the fixed cam, a reversing cam used in place of the releasing cam to be engaged with the movable cam to make the movable cam and the movable side housing to be rotated in the opening operation direction, and the like.

The fact that the rotation cams of the conventional mobile device respectively have small cam portions provided in the narrow space in the hinged members of the mobile device results in the fact that each of the small cam portions is obliged to have a high face pressure and can endure only a certain level of pressure, thereby making it unavoidable to produce each of the rotation cams with a material excellent in moldability and so far difficult in doing so. Also in this aspect, the prior-art mobile device became costly.

This means that the conventional mobile device found it difficult not only to make the mobile device small in size but also to produce the mobile device at a reduced cost.

It is, therefore, an object of the present invention to provide an opening/closing device which can be produced simple in construction and inexpensive in production by reducing the number of the parts forming part of the mobile device and to provide a mobile device small in size, reduced in cost and sufficiently reliable in the hinged members.

Means for Solving the Problem

In order to attain the above object, the opening/closing device according to the present invention comprises (1) a fixed guide member fixed to a first member to be hingedly connected and having a guide center axis 10*a* extending along the center axis of the hinge connection, an operation cam supported on the fixed guide member to be displaceable with respect to the fixed guide member in a predetermined operation direction by an external force, a first rotation cam rotatably supported on the fixed guide member to be engaged with the operation cam and to be rotated with respect to the fixed guide member around the guide center axis in response to the displacement of the operation cam, a second rotation cam supported on the fixed guide member to be displaceable along and rotatable around the guide cent axis in response to the rotation of the first rotation cam, a movable cam regulated from being rotated around the guide center axis with respect to a second member hingedly connected with the first member, and positioned in face-to-face relationship with the second rotation cam and displaceable with respect to the fixed guide member along the guide center axis and rotatable around the guide center axis, urging means for urging the movable cam toward the second rotation cam in one of an opening operation direction to have the second member moved away from the first member and a closing operation direction to have the second member moved toward the first member in response to the engagement state of the second rotation cam and the movable cam, and returning means for returning the first rotation cam to the predetermined operation starting position of the operation cam and for returning the second rotation cam to the predetermined operation starting position where the second member is urged toward the closing operation direction by the urging means, the second member being rotated with respect to the first member toward the opening operation direction through the movable cam by the urging force of the urging means when the operation cam is displaced in the predetermined operation direction by the external operation force, in which: the fixed guide member having inclined guide portions each inclined at an lead angle in a predetermined inclination direction with respect to the surface perpendicular to the guide center axis to have the second rotation cam rotated around the guide center axis in response to the displacement of the second rotation cam along the guide center axis, and the second rotation cam being driven to rotate by the inclined guide portions under a pressing force from the movable cam to have its engagement state with the movable cam changed and to have the urging direction of the second member by the urging means changed when the operation cam is operated to cause the first rotation cam to be rotated from the operation starting position.

The previously mentioned construction of the opening/closing device renders it unnecessary to change the urging direction of the urging means with other cams, thereby making it possible to reduce the number of parts by the reason that the second rotation cam being driven to rotate by the inclined guide portions under a pressing force from the movable cam to have its engagement state with the movable cam changed and to have the urging direction of the second member by the urging means changed when the operation cam is operated to cause the first rotation cam to be rotated from the operation starting position. Therefore, the present invention can provide an opening/closing device small in size and light in weight, and thus suitable for the mobile device. Here, the term "lead angle ($\gamma$)" is intended to mean the displacement (advance) of the driven side per the predetermined operation angle range of the rotation cam representing one taken on the predetermined unit phantom cylindrical surface ($\gamma=\tan^{-1}$ (displacement of the driven side/cam movement angle$\times$engagement radius).

In the opening/closing device according to the present invention, (2) each of the inclined guide portions may be helically curved around the guide center axis. This construction makes it possible for the second rotation cam to be smoothly axially displaced and rotated by being moved helically. It is therefore appreciated that the changing direction operation of the urging means can smoothly be carried out.

In the opening/closing device according to the present invention, it is preferable that (3) the second rotation cam has guide engagement portions respectively engageable with the inclined guide portions at positions spaced apart at a predetermined distance from the guide center axis, and urging direction changing cam portions held in engagement with the movable cam at radii smaller than the predetermined distance from the guide center axis to have the urging direction of the second member by the urging means changed. This construction makes it possible to engage the urging direction changing cam portions with the movable cam at radii smaller than the guide engagement portions from the guide center axis so that the guide engagement portions respectively engaged with the inclined guide portions can each cause a sufficiently larger torque than the load torques of the urging direction changing cam portions on the second rotation cam. This ensures to complete the urging direction changing operation of the urging means.

In the opening/closing device according to the present invention, (4) the second rotation cam may have urging direction changing cam portions held in engagement with the movable cam at predetermined radii from the guide center axis, the urging direction changing cam portions respectively having first inclined cam surfaces inclined in predetermined directions with respect to the surface perpendicular to the guide center axis to urge the movable cam toward the closing operation direction of the second member when the second member is positioned in the neighborhood of the closing operation position closest with the first member in the state of the second rotation cam returned to the predetermined operation starting position, second inclined cam surfaces inclined oppositely to the first inclined cam surfaces with respect to the surface perpendicular to the guide center axis, and top portions projected toward the movable cam between the first inclined cam surfaces and the second inclined cam surfaces to allow the urging direction of the second member to be changed by the urging means, the lead angle $\gamma 2$ of the first inclined cam surfaces being smaller than the lead angle $\gamma 1$ of the inclined guide portions of the fixed guide member. It is therefore preferable that the lead angle of each of the first inclined cam surfaces is smaller than that of each of the inclined guide portions of the fixed guide member.

By this construction, the fact that the lead angle of each of the first inclined cam surfaces of the urging direction changing cam portions is smaller than that of each of the inclined guide portions of the fixed guide member results in the fact that the inclined guide portions can each cause a sufficiently larger torque than the load torques of the urging direction changing cam portions on the second rotation cam. This ensures to complete the urging direction changing operation of the urging means.

Further in the opening/closing device according to the present invention, (5) it is preferable that the fixed guide member has guide shaft portions in coaxial relationship thereof, the first rotation cam and the second rotation cam being guided by the guide shaft portion in coaxial relationship with the fixed guide member. This construction can allow the fixed guide member to guide the first rotation cam and the second rotation cam through the guide shaft portion, thereby making it possible to stably guide the first rotation cam and the second rotation cam.

The opening/closing device according to the present invention, (6) preferably further comprises a bottomed cylindrical body supported on and coaxial with the guide shaft portion and integrally engaged in rotation direction with the movable cam and the second member, the urging means being constituted by a resilient member positioned between the bottomed cylindrical body and the movable cam. This construction can cause the bottomed cylindrical body to be supported on the guide shaft portion and can accommodate the resilient member as urging means in the bottomed cylindrical body. This makes it possible to handle the essential elements forming part of the opening/closing device as a unit on the guide shaft portion. Also, this render it possible to impart the bottomed cylindrical body other functions to guide the movable cam while the movable cam being axially displaced and to engage with and thus integrally rotate together with other members other than the function to hold one end of the resilient member.

In the opening/closing device according to the present invention, (7) the second rotation cam and the movable cam may respectively have a plurality of kinds of end surface cam portions formed thereon at different radii from the guide center axis in opposing relationship with one another, the plurality of kinds of end surface cam portions including urging direction changing outer cam portions changed in engagement state while being axially pressed by the urging means to allow the urging direction of the second member to be changed when the operation cam is operated to cause the first rotation cam to be rotated from the predetermined operation starting position, and urging direction changing inner cam portions engaged with each other at respective positions closer to the guide center axis than the urging direction changing outer cam portions and changed in engagement state in synchronism with the urging direction changing outer cam portions while being axially pressed by the urging means to allow the urging direction of the second member to be changed when the operation cam is operated to cause the first rotation cam to be rotated from the predetermined operation starting position.

In this construction, the second rotation cam and the movable cam respectively have urging direction changing outer cam portions and urging direction changing inner cam portions changed in engagement state at the engaged portions of the second rotation cam and the movable cam in synchronism with each other to cause the urging direction by the urging means to be changed, thereby making it possible to set the operation range of the individual urging direction changing cam portion at more than 180 degrees and to sufficiently secure the engagement range of the cams opposing to each other. As a consequence, it is possible to decrease the surface pressure applied on the surfaces of the engaged portions of the cams, and thus to mold (for example in a cast molding) the second rotation cam and the movable cam for example with a material excellent in moldability. The cam surface inclined to urge in the opening operation direction can properly be curved or bent, thereby facilitating to set on the way to the opening operation the reduced speed area or the intermediate stop area which is gentle in its slope.

In the opening/closing device according to the present invention, (8) the fixed guide member and the movable cam preferably respectively have end surface positioning cam portions axially opposing to one another, the movable cam being disengaged from the second rotation cam to have the end surface positioning cam portions of the fixed guide member and the movable cam engaged with one another, thereby maintaining the second member positioned at its opened position when the second member is approached to the position where the second member is remotest from the first member.

According to the above mentioned construction, the fixed guide member and the movable cam respectively have end surface positioning cam portions axially opposing to one another, the movable cam being disengaged from the second rotation cam to have the end surface positioning cam portions of the fixed guide member and the movable cam engaged with one another, thereby maintaining the second member positioned at its opened position when the second member is approached to the position where the second member is remotest from the first member. It is therefore possible to attain a smooth transferring operation between the engagement and disengagement operations of the second rotation cam and the movable cam and the positioning operations of the end surface positioning cam portions.

In the opening/closing device according to the present invention, (9) the second rotation cam and the movable cam respectively have end surface cam portions axially opposing to one another at predetermined radii from the guide center axis, the end surface positioning cam portions of the fixed guide member and the movable cam preferably being engaged and disengaged at the radius positions closer to the guide center axis than the end surface cam portions of the second rotation cam and the movable cam. In this construction, the end surface positioning cam portions are arranged at the positions closer to the guide center axis as above mentioned, thereby making it possible to facilitate engaging the end surface positioning cam portions of the fixed guide member and the movable cam with one another through the second rotation cam.

On the other hand, the mobile device according to the present invention (10) uses the opening/closing device is constructed by an openable and closable housing of a foldable type which comprises a first member and a second member hingedly connected with each other. This construction can provide a mobile device which is small in size, produced at low cost, and sufficiently reliable in the hinge connection thereof by using the opening/closing device which can reduce the surface pressures applied on the rotation cams, thereby making the opening/closing devise simple in construction, small in size and produced at low cost.

The present invention can provide an opening/closing device small in size, light in weight and suitable as a mobile device by the reason that the rotation of the first rotation cam with the operation of the operation cam causes the second rotation cam guided by the inclined guide portion to be rotated while axially moving under the pressing force of the movable cam and thus to be changed in the engagement state with the movable cam, thereby making the urging direction of the second member changed with the urging means so that there is no need for other cams which cause the urging direction of the urging means to be changed, resulting in reducing the number of parts and elements to be assembled in the opening/closing device. As a consequence, the present invention can provide a mobile device which is small in size, produced at low cost, and sufficiently reliable in the hinge connection thereof by using the opening/closing device which can reduce the surface pressures applied on the rotation cams, thereby making the opening/closing devise simple in construction, small in size and produced at low cost.

BRIEF DESCRIPTION OF THE DRAWINGS

The characteristics and advantageous aspects of the present invention will be better understood from the following detailed description when considered in connection with attached drawings, wherein:

FIG. 2 shows a cross sectional view of a hinged connection portion forming part of the mobile phone shown in FIG. 1;

FIG. 17 is a motion explanation view schematically showing a fixed cam forming part of the opening/closing device according to the second embodiment of the invention; and FIG. 18 is a motion explanation view schematically showing a fixed cam forming part of the opening/closing device according to the third embodiment of the invention.

EXPLANATION OF THE REFERENCE NUMERALS

Figure 1A:
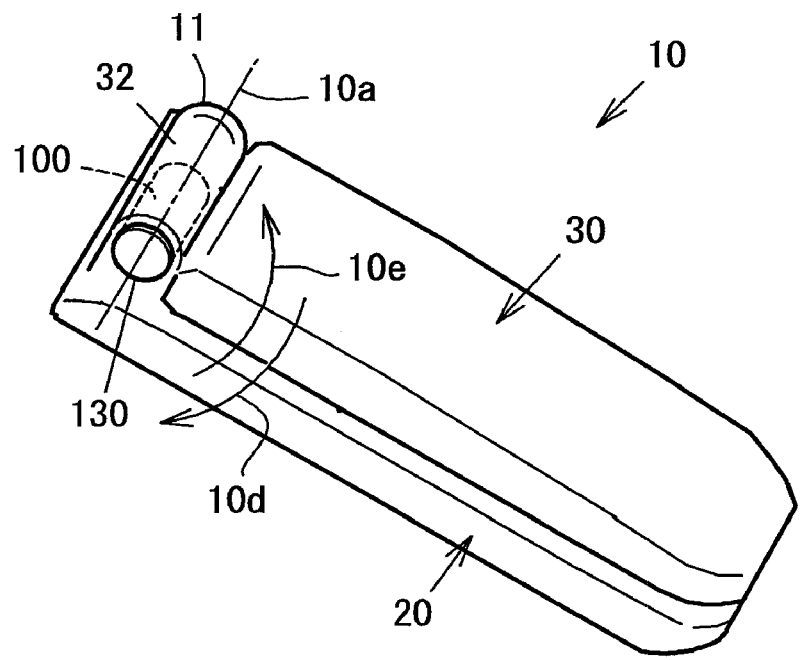
FIG. 1 shows a mobile phone provided with an opening/closing device according to a first embodiment of the present invention, (a) is an outside perspective view showing the closed state of the opening/closing device, and (b) is an outside perspective view showing the opened state of the opening/closing device.

10: mobile telephone (mobile device)
10*a*: center axis of the hinge connection
20: fixed housing
30: movable housing
100: opening/closing hinge unit (opening/closing device)
110: fixed case (fixed guide member)
110*c*: guide center axis
115: inclined guide portion
116: cam support axial portion (guide axial portion)
116*a*, 151*a*: end surface positioning cam portion
120: movable case (bottomed cylindrical body)
125: push button (operation member)
130: push cam (operation cam)
140: fixed cam (second rotation cam)
141: guide engagement portion
142, 242, 342: urging direction changing outer cam portion
143, 243, 343: urging direction changing inner cam portion
142*a*, 143*a*, 242*a*, 243*a*, 342*a*, 343*a*: first inclined cam surface
142*b*, 143*b*, 242*b*, 243*b*, 342*b*, 343*b*: top portion
142*c*, 143*c*, 242*c*, 243*c*, 342*c*, 343*c*: second inclined cam surface
150, 250, 350: rotation cam (movable cam)
153: cam portion (urging direction changing outer cam portion)
154: cam portion (urging direction changing inner cam portion)
153*a*, 154*a*: first inclined cam surface
153*b*, 154*b*: top portion
153*c*, 154*c*: second inclined cam surface
160: lock releasing cam (first rotation cam)
180: guide shaft (guide shaft portion)

THE PREFERRED EMBODIMENT OF THE INVENTION

The preferred embodiments of the present invention will hereinafter be described in detail with reference to the attached drawings.

First Embodiment

FIGS. 1-16 show an opening/closing device according to the first embodiment of the present invention and a mobile phone provided with the opening/closing device.

Figure 1B:
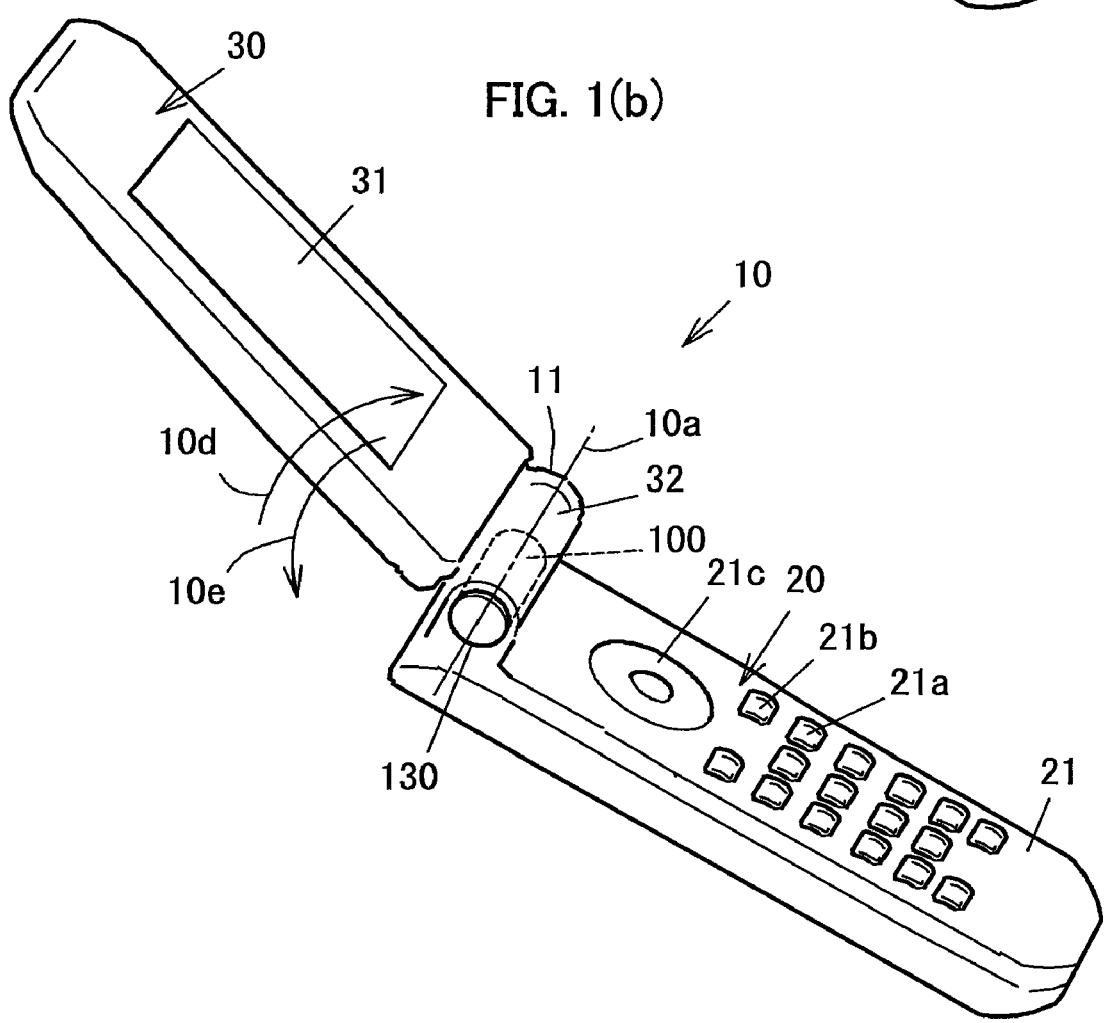

The mobile phone 10 is shown in FIGS. 1 and 2 to be a mobile type of information terminal (mobile device) and a foldable type to be handled by a single hand, and comprises a pair of housings 20 and 30 hingedly connected together and thus relatively rotatable with respect to each other. The housing 20 has an operation surface 21 provided with a plurality of operation portions 21*a*, 21*b*, and 21*c*, a sound input portion (not shown) and the like. The operation surface 21 is opened and closed by the rotation of the housing 30. The housing 30 has a surface provided with a display screen 31 and a sound output portion (with no reference numeral), the surface being in opposing relationship with the operation surface 21 of the housing 20 when the mobile phone 10 is in a folded state. The housings 20 and 30 respectively have electric circuits provided therein for communications, display, sound processing and others. In usual cases, the housing 20 provided with the operation portions 21*a*, 21*b*, and 21*c* is supported by one hand, so that the housing 20 is called a fixed housing and the housing 30 is called a movable housing in the embodiments hereinafter appearing.

As shown in FIG. 2, the hingedly connected portion 11 forming part of the mobile phone 10 is provided at its one end portion with an opening/closing hinge unit 100 functioned as an opening/closing device and at the other end portion formed with wiring passageways 26 and 33.

Figure 3:
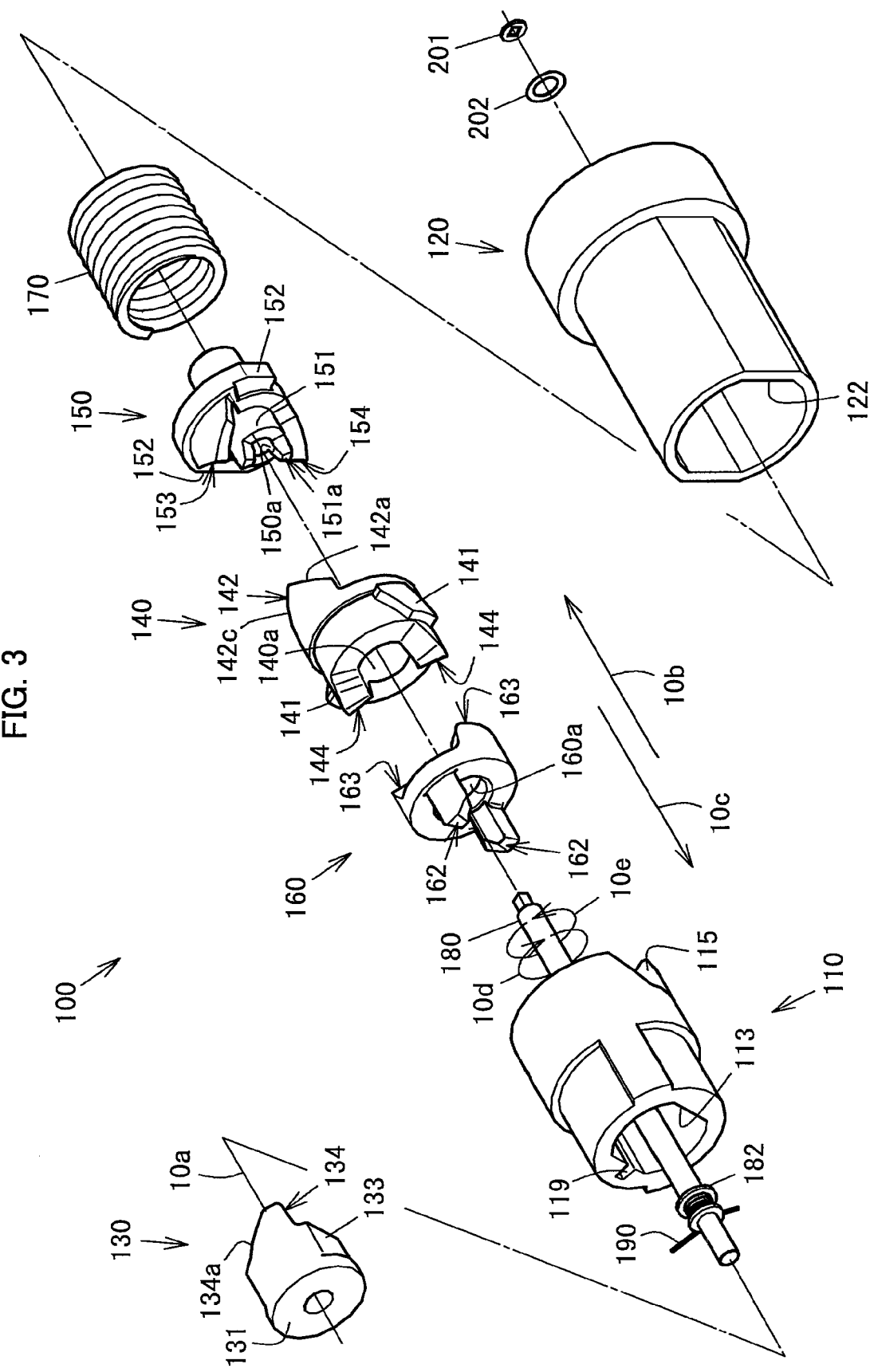
FIG. 3 shows a perspective explosion view of the opening/closing device according to the first embodiment of the present invention.
Figure 4:
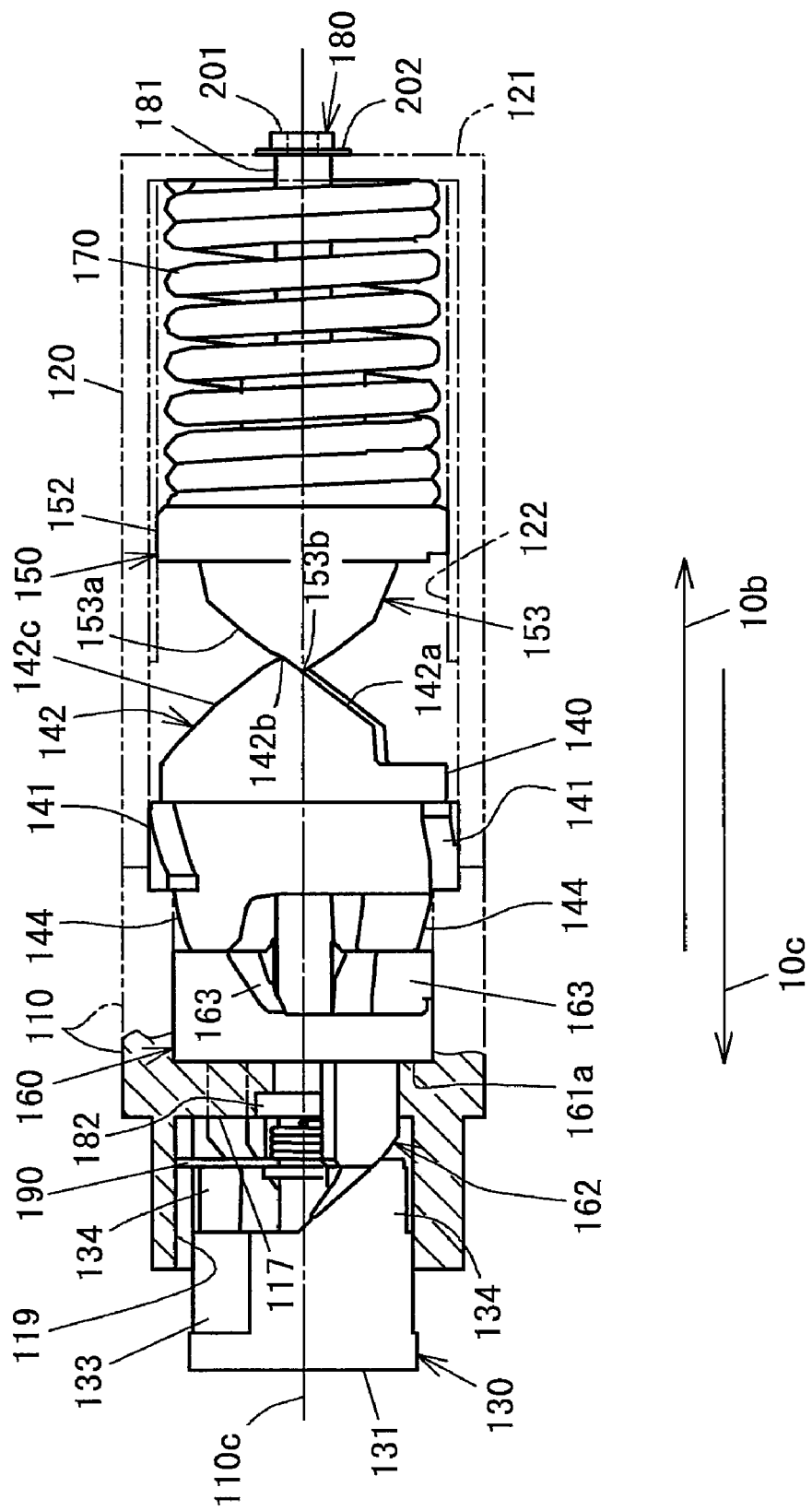
FIG. 4 shows a front view of essential parts illustrating the internal construction of the opening/closing device according to the first embodiment of the present invention.

The opening/closing hinge unit 100 is shown in FIGS. 3 and 4 to comprise a fixed case 110 (fixed guide member) fixed to the fixed housing 20, i.e., a first member of hingedly connected members, a movable case 120 made up of a bottomed cylindrical body integrally connected in the rotation direction with a hinged portion 32 forming part of the movable housing 30, i.e., a second member of hinged connected members, to be regulated from being rotated around the axis thereof, a push cam 130 supported on the one end portion of the fixed case 110 to be axially displaceable with respect to the fixed case 110, a plurality of rotation cams accommodated in and supported by the fixed case 110 and including a fixed cam 140 (second rotation cam) and a lock releasing cam 160 (first rotation cam), a rotation cam 150 (movable cam) accommodated in and supported by the movable case 120 in engagement with the fixed cam 140 to be axially displaceable with respect to the movable case 120 and rotated together with the movable case 120, a compression spring 170 (resilient member) disposed between the movable case 120 and the rotation cam 150, a guide shaft 180 (guide shaft portion) coaxially disposed in and supported by the fixed case 110, and a returning spring 190 (return means) for returning the lock releasing cam 160 to the predetermined operation starting position.

The fixed case 110 has a guide center axis 110*c* positioned on the center axis 10*a* of the hinge connection between the fixed housing 20 and the movable housing 30 and fixed to one of hingedly connecting units 23 and 24 (not shown in detail) which serve to hingedly connect the fixed housing 20 and the movable housing 30, for example, an inner surface of a fixed housing side portion of the hingedly connecting unit 23.

The push cam 130 is disposed in the hingedly connecting unit 23 and axially inwardly operated from an external force (in a direction shown by an arrow mark 10b in FIG. 4) by way of a push button 25 provided in the hingedly connected portion 11 (for example the fixed housing 20). The push cam 130 serves as an operation cam to be displaced in an axial direction, i.e., an operation direction with respect to the fixed case 110 by the external force of the push button 25. The operation cam necessarily may not be a push type of one such as a push cam 130 and may be of those types, a lever type, a slide type and a rotation type not specified in the input operation direction if the operation force is imparted along the guide center direction of the fixed case 110.

Figure 5A:
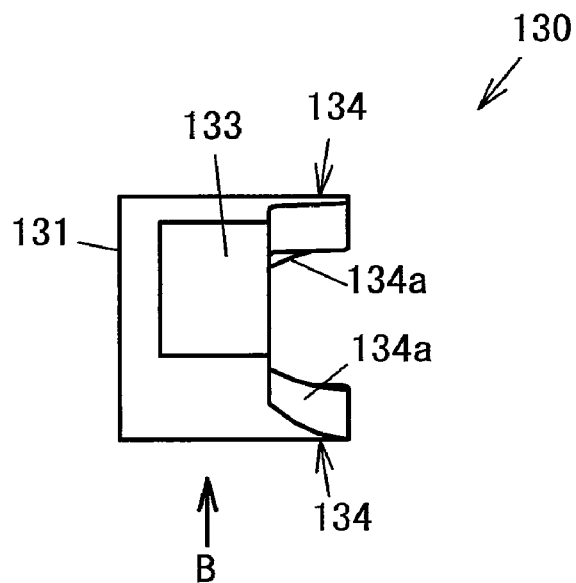
FIG. 5 shows a push cam forming part of the opening/closing according to the first embodiment of the present invention, (a) is its front view, (b) is a view seen from the arrow B in the front view of FIG. 5(a), and (c) is a view seen from the arrow C in the view (b) of FIG. 5(a)
Figure 5B:
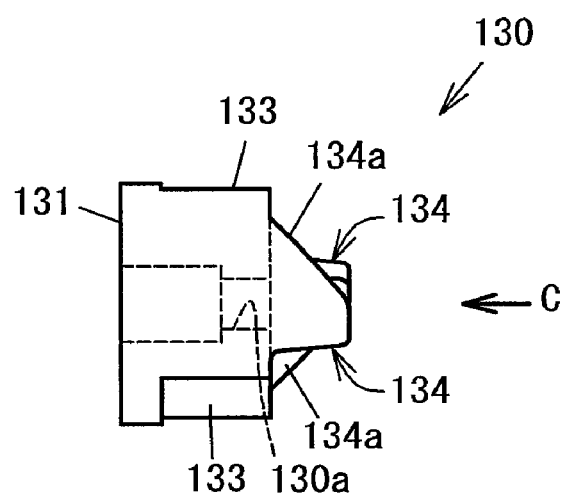
Figure 5C:
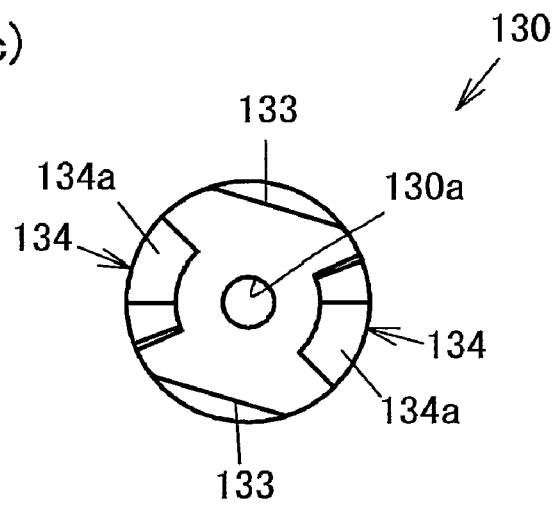
Figure 6A:
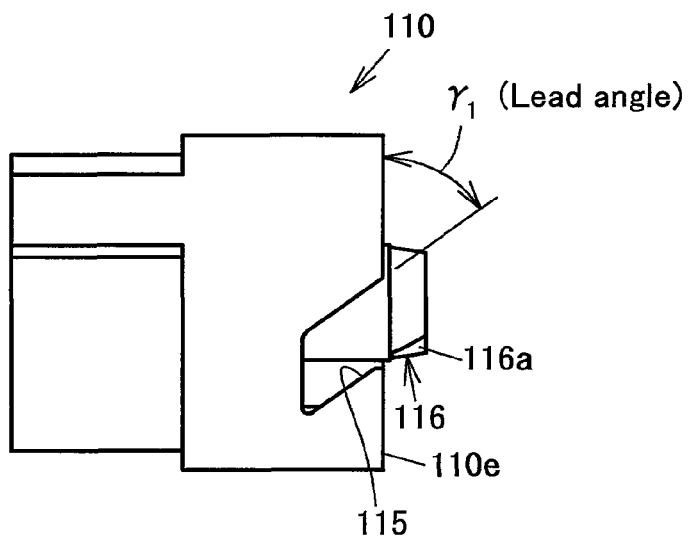
FIG. 6 shows a fixed case forming part of the opening/closing device according to the first embodiment of the present invention, (a) is its front view, (b) is its under view, and (c) its cross sectional front view.
Figure 6B:
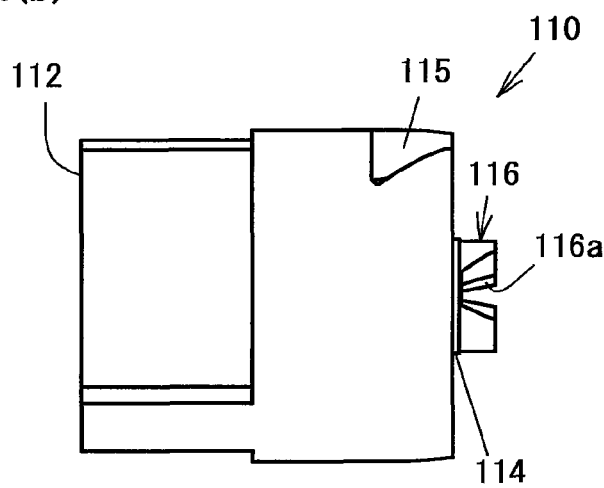

In the opening/closing hinge unit 100 of the present embodiment, the push cam 130 is shaped as shown for example in FIG. 5, while the fixed case 110 is of shape as shown for example in FIGS. 6 and 7.

In FIG. 5, the push cam 130 is formed with a guide shaft receiving hole 130a to receive a guide shaft 180 and disposed on the guide center axis 110c of the fixed case 110 through the guide shaft 180. The push cam 130 has an operation end portion 131 having an operation force from the push button 25 imparted thereon, a rotation stopping portion 133 formed by a pair of parallel flat cut portions adapted to be received in a receiving hole 113 (see FIG. 3) formed in the fixed case 110, and a pair of cam portions 134 designed to rotate a lock releasing cam 160 in engagement with the lock releasing cam 160. The cam portions 134 have respective inclined portions 134a each having a shape in conformity with the shape of each of operation side cam portions 162 forming part of the lock releasing cam 160. The lock releasing cam 160 has a pair of operation side cam portions 162 to be respectively engaged with the cam portions 134, and is rotatable within the range of a predetermined rotation angle in response to the axial displacement of the push cam 130.

Figure 6C:
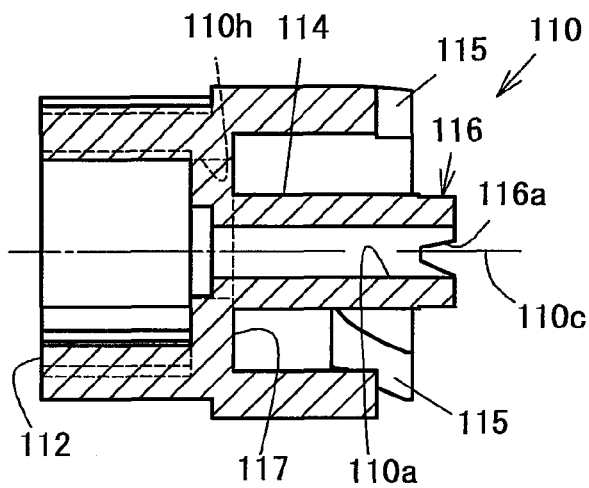
Figure 7A:
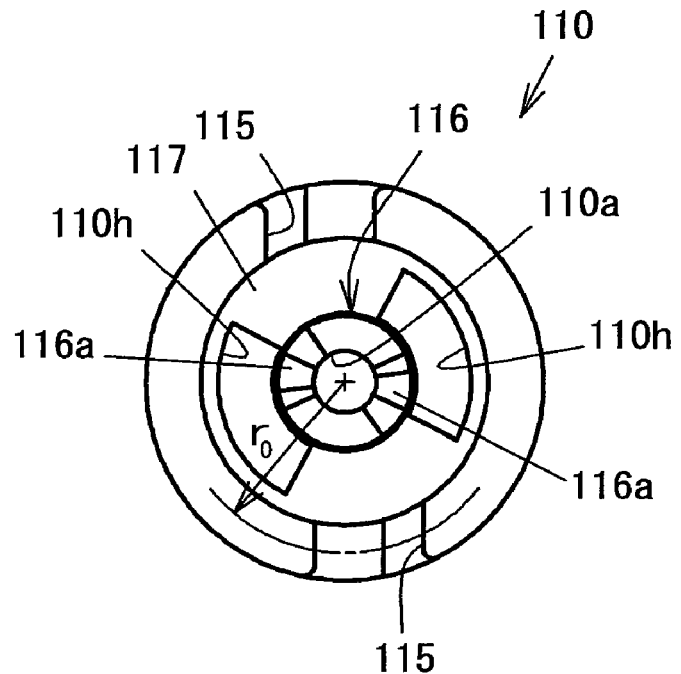
FIG. 7 is a view showing both axial end faces of the fixed case shown in FIG. 6, (a) is an end face view seen from the inside of the opening/closing device, and (b) is an end view seen from the outside of the opening/closing device.
Figure 7B:
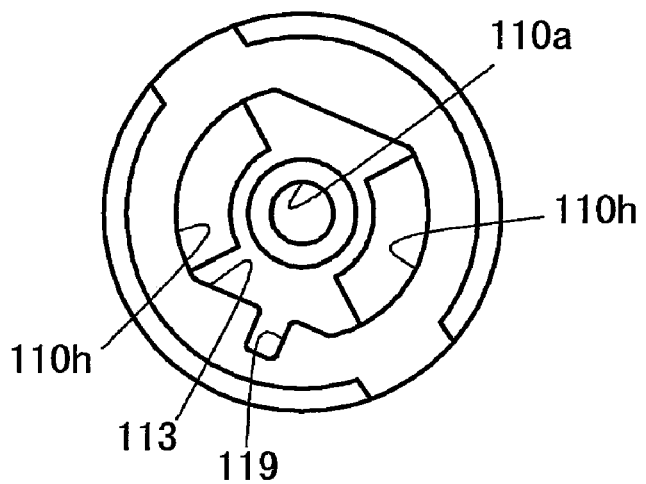
Figure 8A:
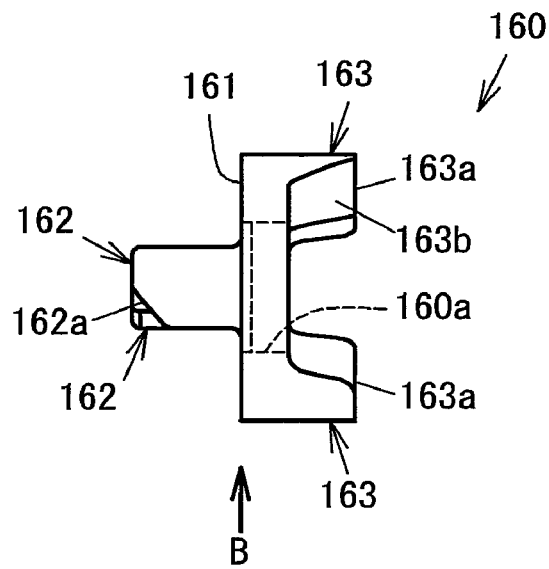
FIG. 8 shows a lock release cam forming part of the opening/closing device according to the first embodiment of the present invention, (a) is its front view, (b) is a view seen from the arrow B in the front view (a) of FIG. 8, and (c) is a view seen from the arrow C in the view (b) of FIG. 8.
Figure 8B:
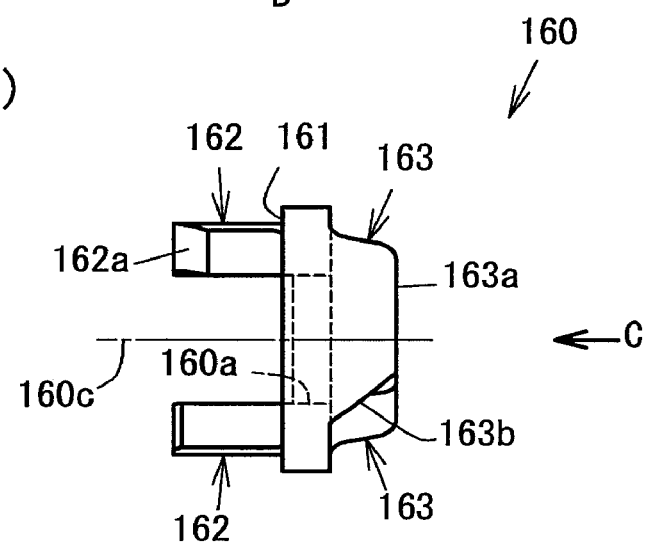
Figure 8C:
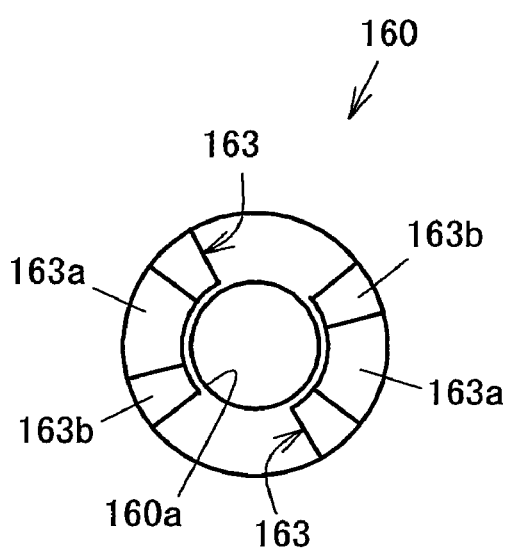

As shown in FIG. 8, the pair of operation side cam portions 162 provided on one end portion of the lock releasing cam 160 respectively have inclined surfaces 162a and are disposed in 180 degrees symmetrical relationship with each other with respect to the center axis 160c of the guide hole 160a. With respect to the pair of the operation side cam portions 162, a pair of fan-shaped holes 110h (see FIGS. 7(a) and 7(b)) are formed in the intermediate inner bottom wall portion 117 of the fixed case 110 in 180 degrees symmetrical relationship with each other with respect to the center axis 160c of the guide hole 160a as shown in FIG. 6(c). The lock releasing cam 160 is held in slidable engagement with the intermediate inner bottom wall portion 117 of the fixed case 110 at its seat face 161 formed on the lock releasing cam 160 in perpendicular relationship with the center axis 160c of the guide hole 160a. The lock releasing cam 160 has a pair of releasing cam portions 163 at the other end side thereof, the releasing cam portions 163 each having a fixed cam holding surface 163a and an inclined surface 163b held in engagement with the fixed cam 140. The releasing cam portions 163 are disposed in 180 degrees symmetrical relationship with each other with respect to the center axis 160c of the guide hole 160a.

As shown in FIG. 6(c), the fixed case 110 has a cam support shaft portion 116 in the form of a cylindrical shape and projected from the intermediate inner bottom wall portion 117 in coaxial relationship with the guide center axis 110c. The fixed cam 140 and the lock releasing cam 160 are guided by the cam support shaft portion 116 and disposed in and supported by the fixed case 110 to be rotatable with respect to the fixed case 110 and in coaxial relationship with the guide center axis 110c. The guide shaft 180 is coaxially received in the cam support shaft portion 116. The above mentioned cam support shaft portion 116 and the guide shaft 118 constitutes as a whole a guide axial portion defined in the present invention. The fixed case 110, the push cam 130, the fixed cam 140, and the lock releasing cam 160 may have a proper lubricant agent such as grease and the like applied thereon according to the present invention.

On the other hand, the fixed case 110 is provided at its right end side in FIG. 6 with a pair of inclined guide portions 115 which have the fixed cam 140 rotated around the guide center axis 110c in response to the axial displacement of the fixed cam 140. The inclined guide portions 115 are inclined at a predetermined lead angle γ1 with respect to the flat surface perpendicular to the guide center axis 110c, for example, the end surface 110e of the fixed case 110 and disposed in 180 degrees symmetrical relationship with each other with respect to the guide center axis 110c. Each of the inclined guide portions 115 is in the form of a helically curved shape around the guide center axis 110c. Here, the term "lead angle" is intended to mean a helical inclination correspondent to a lead angle ($\tan^{-1}$ (lead L)/circumference length πd in a gear, and here has a value corresponding to the displacement (advance) of the driven side per the specified operation angle range of the movable cam taken on a predetermined unit phantom cylindrical surface.

Figure 9A:
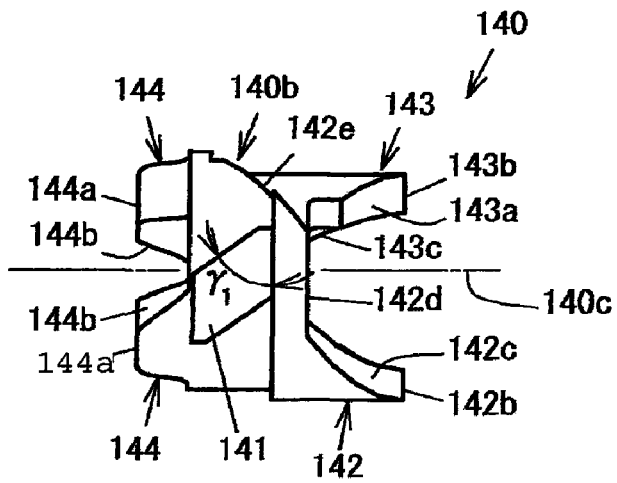
FIG. 9 shows a fixed cam forming part of the opening/closing device according to the first embodiment of the present invention, (a) is its front view, (b) is a view seen from the arrow B in the front view (a) of FIG. 9, and (c) is a view seen from the arrow C in the view (b) of FIG. 9.

The fixed cam 140 has a pair of guide engagement portions 141 projected radially outwardly and spaced from each other at 180 degrees, and held in engagement with the pair of inclined guide portions 115. As shown in FIG. 9(a), both side ends of each of the guide engagement portions 141 are inclined at an lead angle γ1 with respect to a flat surface perpendicular to the guide center axis, for example, the center axis 140c of the guide hole 140a. The guide engagement portions 141 are respectively held in engagement with the inclined guide portions 115 at the points spaced apart at a predetermined distance (radius r0) from the guide center axis 110c of the fixed case 110.

The fixed cam 140 has a pair of release side cam portions 144 opposing to the respective lock releasing cam 160 and having a pair of facing surfaces 144a opposing to the lock releasing cam 160, and a pair of inclined surfaces 144b held in engagement with the inclined surfaces 163b of the releasing cam portions 163. The engagement of the release side cam portions 144 of the fixed cam 140 and the releasing cam portions 163 of the lock releasing cam 160 at the inclined surfaces 144b and 163b by the rotation of the lock releasing cam 160 enables the fixed cam 140 to be axially displaceable in response to the rotation of the lock releasing cam 160. Here, the lead angle between the inclined surfaces 144b and 163b and the flat surface perpendicular to the guide center axis 110c of the fixed case 110 is set at an angle (gentle inclination angle) smaller than the lead angle γ1.

It is therefore understood that the fixed cam 140 is engaged at its leading end with the lock releasing cam 160 and displaced along the guide center axis 110c of the fixed case 110 and rotated around the guide center axis 110c of the fixed case 110, thereby being moved with a helically twisting motion while being guided by the inclined guide portions 115 when the inclined surfaces 144b of the release side cam portions 144 are respectively engaged with the inclined surfaces 163b of the releasing cam portions 163 of the lock releasing cam 160.

Figure 9B:
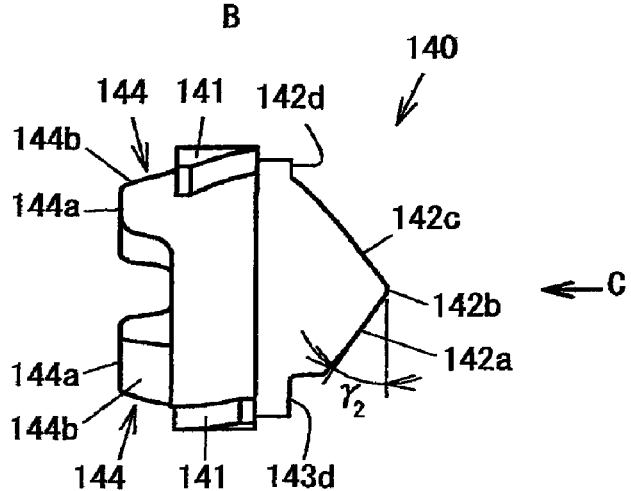
Figure 9C:
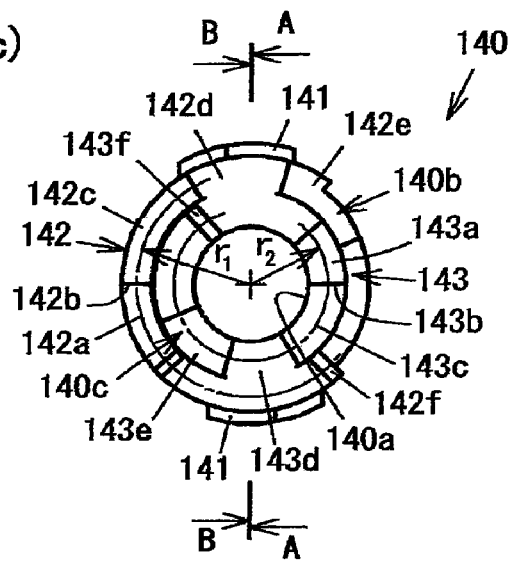

Further, the fixed cam 140 is shown in FIGS. 9(a) to 9(c) and has a pair of urging direction changing cam portions 142 and 143 held in opposing relationship with the rotation cam 150. The urging direction changing cam portions 142 and 143 are engaged with the rotation cam 150 at the points smaller in diameter than the predetermined distance r0 from the center axis 140c of the guide hole 140a coincident with the guide center axis 110c. The urging direction changing cam portions 142 and 143 are held in engagement with the respective cam portions 153 and 154 of the rotation cam 150 on phantom cylindrical surfaces (shown in two dotted lines in FIG. 9(c)) with the different radii r1 and r2 from the center axis 140c.

Figure 10A:
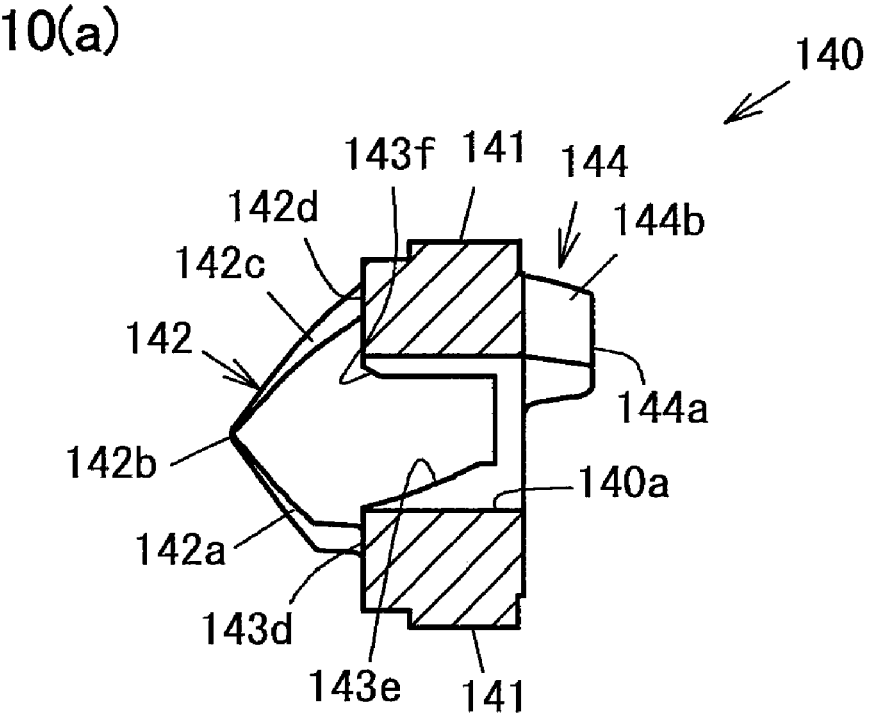
FIG. 10 shows a plurality of cam shapes of fixed cams shown in FIG. 9, (a) is a cross sectional view taken along the lines A-A in FIG. 9(c), and (b) is a cross sectional view taken along the lines B-B in FIG. 9(c)
Figure 10B:
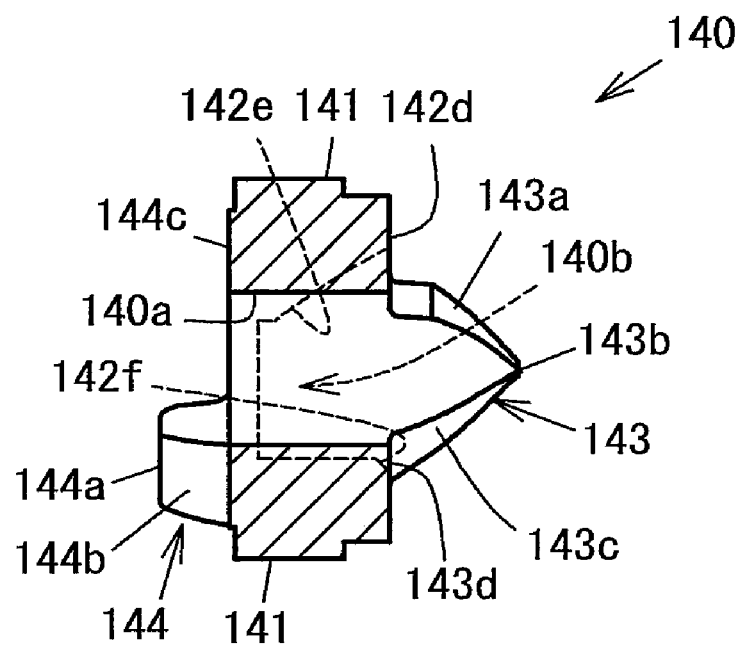

As shown in FIGS. 9(b) and 10(a), the urging direction changing outer cam portion 142, which serves to change the urging direction radially outwardly i.e., outwardly in a radius direction, has a first inclined cam surface 142a inclined to the face perpendicular to the center axis 140c, a second inclined cam surface 142c inclined oppositely to the first inclined cam surface 142a with respect to the face perpendicular to the center axis 140c, and a top portion 142b projected toward the rotation cam 150 between the first inclined cam surface 142a and the second inclined cam surface 142c. As shown in FIG. 10(b), the urging direction changing inner cam portion 143, which serves to change the urging direction radially inwardly i.e., inwardly in a radius direction, is angularly displaced at 180 degrees with respect to the urging direction changing outer cam portion 142 which serves to change the urging direction radially outwardly i.e., outwardly in a radius direction as mentioned above, and has a first inclined cam surface 143a inclined to the face perpendicular to the center axis 140c, a second inclined cam surface 143c inclined oppositely to the first inclined cam surface 143a with respect to the face perpendicular to the center axis 140c, and a top portion 143b projected toward the rotation cam 150 between the first inclined cam surface 143a and the second inclined cam surface 143c. The urging direction changing inner cam portion 143 has, below the second inclined cam surface 143c, an intermediate speed reduction area 143d on the surface perpendicular to the center axis 140c and is formed with an extended inclined surface 143e sharply inclined in a direction the same as the second inclined cam surface 143c.

Figure 11A:
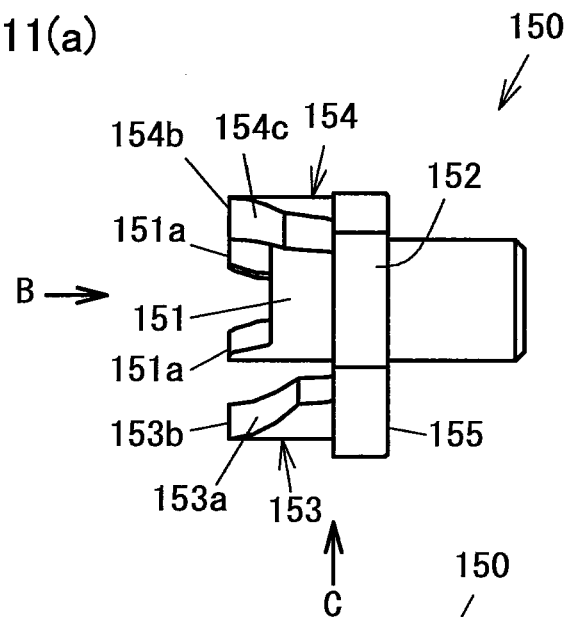
FIG. 11 shows a rotation cam forming part of the opening/closing device according to the first embodiment of the present invention, (a) is its front view seen from the parallel cut face for stopping rotation of the rotation cam, (b) is a view seen from the arrow B in FIG. 11(a), and (c) is a view seen from the arrow C in FIG. 11(a)
Figure 11B:
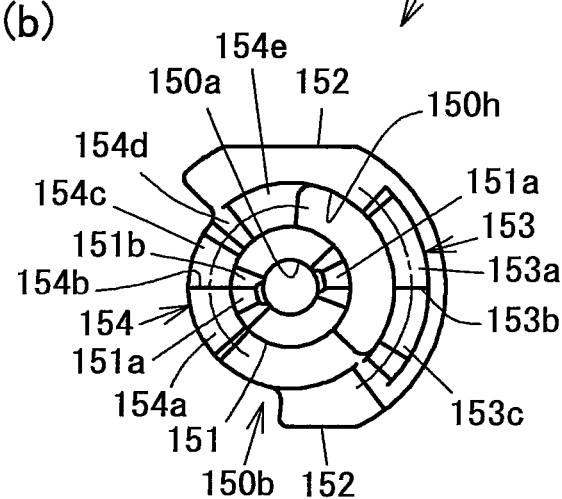
Figure 11C:
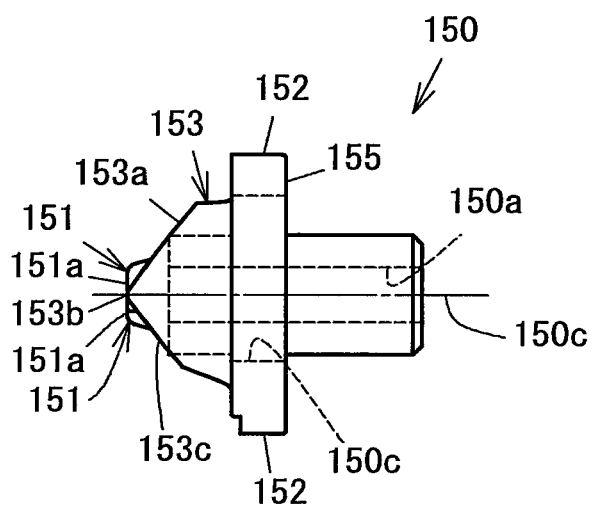

On the other hand, the urging direction changing radially-outward cam portion 153 of the rotation cam 150 is shown in FIGS. 11(a) to 11(c) to have a first inclined cam surface 153a inclined at an inclination angle with respect to a flat surface perpendicular to the center axis 150c of the guide hole 150a, a second inclined cam surface 153c oppositely inclined with respect to a flat surface perpendicular to the center axis 150c of the guide hole 150a, and a top portion 153b projected toward the fixed cam 140 between the first inclined cam surface 153a and the second inclined cam surface 153c. As shown in FIGS. 11(a) and 11(b), the urging direction changing radially-inward cam portion 154 of the rotation cam 150 is in diametrically opposed relationship with the urging direction changing radially-outward cam portion 153, and close to the center axis 150c of the guide hole 150a in comparison with the urging direction changing radially-outward cam portion 153. In a similar way, the urging direction changing radially-inward cam portion 154 has a first inclined cam surface 154a inclined at an inclination angle with respect to a flat surface perpendicular to the center axis 150c of the guide hole 150a, a second inclined cam surface 154c inclined oppositely to the first inclined cam surface 154a with respect to a flat surface perpendicular to the center axis 150c of the guide hole 150a, and a top portion 154b projected toward the fixed cam 140 between the first inclined cam surface 153a and the second inclined cam surface 153c. The radially-inward cam portion 154 has, below the second inclined cam surface 154c, an intermediate speed reduction area 154d on the surface perpendicular to the center axis 150c and is formed with an extended inclined surface 154e sharply inclined in a direction the same as the second inclined cam surface 154c and finally connected to the fan-shaped hole portion 150h.

The rotation cam 150 has at its center portion a boss portion 151 in opposing relationship to the cam support shaft portion 116 of the fixed case 110, the boss portion 151 having at its forward end a pair of convex end surface positioning cam portions 151a to be engaged with the pair of concave end surface positioning cam portions 116a (see FIGS. 6 and 7) provided at the cam support shaft portion 116 of the fixed case 110. The rotation cam 150 and the fixed case 110 have end surface positioning cam portions 116a and 151a, respectively, opposing to each other along the guide center axis of the fixed case 110. Under the state that the movable housing 30 is positioned at the neighborhood of its opened position where the movable housing 30 is mostly spaced apart from the fixed housing 20, the rotation cam 150 is disengaged and moved away from the fixed cam 140 while the end surface positioning cam portions 116a and 151a are engaged with each other so that the movable housing 30 is positioned and retained at the opened position.

As shown in FIG. 11(b), the end surface positioning cam portions 116a and 151a of the fixed case 110 and the rotation cam 150 are engaged and disengaged from each other at their radius positions nearer to the guide center axis 10c of the fixed case 110 than the urging direction changing cam portions 142, 153 and 143, 154 respectively constituting end cam portions of the fixed cam 140 and rotation cam 150. The engaged portions of the end surface positioning cam portions 116a and 151a of the fixed case 110 and the rotation cam 150 are set at a predetermined angle to be imparted disengagement torque when the fixed housing 20 and the movable housing 30 are manually operated to be opened.

On the other hand, FIG. 4 shows a compression spring 170 provided between the rotation cam 150 and the movable case 120 to urge the rotation cam 150 toward the fixed cam 140. This means that the compression spring 170 serves as urging means to urge the rotation cam 150 toward the fixed cam 140 in one of the opening operation direction 10c (see FIG. 1) to have the movable case 120 and the movable housing 30 moved away from the fixed housing 20 and the closing operation direction 10d (see FIG. 1) to have the movable case 120 and the movable housing 30 moved toward the fixed housing 20 in response to the engagement state of the fixed cam 140 and the rotation cam 150.

For example, under the state that the fixed cam 140 is returned to its operation starting position, the movable housing 30 is manually operated to be positioned in the neighborhood of the closing operation position having the movable housing 30 moved to a position nearest to the fixed housing 20. At this time, the rotation cam 150 is imparted an axially outward urging force (see an arrow mark 10c in FIG. 4) by the compression spring 170 and engaged with the first inclined cam surfaces 142a and 143a so that the movable housing 30 is urged toward the closing operation. When the movable housing 30 is operated to the position where the movable housing 30 is opened more than a predetermined angle with respect to the fixed housing 20, the rotation cam 150 is imparted an axially outward urging force by the compression spring 170 and engaged with the second inclined cam surfaces 142c and 143c so that the movable housing 30 is urged toward the opening operation to have the rotation cam 150 urged toward the opening operation of the movable housing 30. In this sense, the term "in response to the engagement state of the fixed cam 140 and the rotation cam 150" means "in response to anyone of the inclined surfaces of the pair of the urging force changing outer cam portions 142 and 143 of the fixed cam 140 engaged with the fixed cam 150".

The lead angle γ2 formed between the first inclined cam surfaces 142a and 143a of the pair of urging force changing outer cam portions 142 and 143 and the surface perpendicular to the guide center axis 110c of the fixed case 110 is lower than the lead angle γ1 formed between the inclined guide portions 115 of the fixed case 110 and the surface perpendicular to the guide center axis 110c of the fixed case 110. It will be understood from the foregoing description that the lead angle is a value obtained in response to the displacement (advance) of a driven side/cam moved angle(θ)×engagement radius(r). This means that the radially inwardly urging direction changing cam 143 is sharply inclined per a real sliding distance, the lead angle of the radially inwardly urging direction changing cam 143 is the same as that of the radially outwardly urging direction changing cam 142.

The rotation cam 150 is shown in FIG. 4 as coaxially supported on the fixed case 110 through the guide shaft 180 to ensure that the rotation cam 150 is axially displaceable with respect to the fixed case 110 along the guide center axis 110c and rotatable around the guide center axis 10c.

The guide shaft 180 is shown in FIG. 4 as having a large diameter portion 182 integrally formed with the guide shaft 180 at an axial position of the guide shaft 180 spaced apart from one end of the guide shaft 180 to be engageable with the intermediate inner bottom wall portion 117 in opposite relationship with the lock releasing cam 160, an other end portion 181 securely connected with a stop ring 201 for example by the way of a caulking method. The bottom wall portion 121 of the movable case 120 is stopped to be removed from the guide shaft 180 through a spacer ring 202 which is attached on the guide shaft 180 in the neighborhood of the stop ring 201 and is large in area than the stop ring 201. The large diameter portion 182 has a returning spring 190 wound and retained thereon.

The movable case 120 is coaxially supported on the fixed case 110 by the guide shaft 180 while being received in a guide hole (no reference numeral) formed at the center of the bottom wall portion 121 of the bottomed cylindrical body thereof. The guide hole may be made large in length by making the guide hole projected inwardly. The movable case 120 is shown in FIG. 3 to be integrally engaged with the movable housing 30 in the rotation direction by the parallel cut portions 122. The movable case 120 may be provided with axially projected and grooved portions in place of the parallel cut portions 122.

The returning spring 190 is constituted by a helical coil spring intervening for example between a longitudinally extending groove 119 of the fixed case 110 and the lock releasing cam 160 to urge the lock releasing cam 160 to reduce an engagement area of the lock releasing cam 160 and the push cam 130 while the helical coil spring is supported on the large diameter portion 182 of the guide shaft 180. The urging force of the returning spring 190 allows the fixed cam 140 to be moved by the compression spring 170 toward the starting position where the movable housing 30 is urged toward the closing operation position with respect to the fixed cam 140. The lock releasing cam 160 is returned to the predetermined operation starting position, and the push cam 130 is also returned to its original position. The push cam 130 may be returned to the original position together with the push button 25 by other returning spring.

As mentioned above in the present embodiment, the fixed cam 140 and the rotation cam 150 are respectively provided with the urging direction changing cam portions 142, 143, 153, and 154 as a plurality of kinds of end cam portions axially opposing to one another at the different radii r1 and r2 from the guide center axis 110c of the fixed case 110. The end cam portions 142, 143, 153, and 154 are respectively constituted by outer urging direction changing cam portions 142 and 153 which are changed in engagement state while being axially urged with one another by the compression spring 170 to allow the urging direction toward the movable housing 30 to be changed when the push cam 130 is operated to have the lock releasing cam 160 rotated from the operation starting position, and also constituted by urging direction changing inner cam portions 143 and 154 which are engaged with one another at their inner positions radially nearer to the guide center axis 110c of the fixed case 110 than the engaged positions of the outer urging direction changing cams 142 and 153 and are changed in engagement state in synchronism with the inner urging direction changing cams 142 and 153 while being axially urged with one another to change the urging direction toward the movable housing 30 by the compression spring 170 when the push cam 130 is operated to have the lock releasing cam 160 rotated from the operation starting position. The operation of the push cam 130 to cause the lock releasing cam 160 to be rotated from the predetermined operation starting position enables the fixed cam 140 to be guide by the inclined guide portions 115 and to be driven to rotate by the driving force of the rotation cam 150 so that the fixed cam 140 is changed in the engagement state with the rotation cam 150 to allow the urging direction toward the movable case 120 and the movable housing 30 changed under the influence of the compression spring 170.

In the mobile phone 10 according to the present embodiment, the push button 25 is externally operated to have the push cam 130 to be axially moved and displaced in the predetermined direction so that the movable housing 30 can be rotated to the opened operation position with respect to the fixed housing 20 through the rotation cam 150 under the influence of the compression spring 170, and that the movable housing 30 can be manually operated from the returned operation starting position of the fixed cam 140. The completion of the predetermined operations as mentioned above enables the compression spring and the cam to work together until the opening and closing operations are automatically carried out.

The operation of the mobile phone according to the first embodiment of the present invention will be then described hereinafter.

(Manual Opening and Closing Operation)

The following description is directed to the case that the mobile phone 10 is manually opened from a folded state, i.e., a state that the operation surface 21 of the fixed housing 20 is held in face-to-face relationship with the display screen 31 of the movable housing 30. The initial operation state of the opening/closing hinge unit 100 is shown in FIG. 4. Under this state, states of the principal cams of the opening/closing hinge unit 100 are developed and schematically shown in FIG. 12(a). In FIG. 12, the leftward movement of the rotation cam 150 indicates a closing operation of the mobile phone 10, and inversely the rightward movement of the rotation cam 150 represents an opening operation of the mobile phone 10.

Figure 12A:
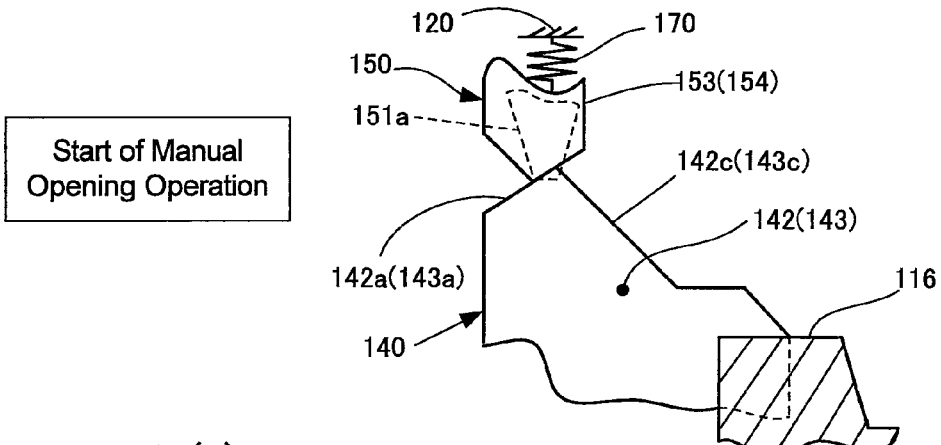
FIG. 12 shows schematic motion explanation views each showing a relative displacement of an essential cam only when the housing forming part of the mobile phone according to the first embodiment of the present invention is manually opened by the push button.

Under the initial state as shown in FIG. 12(a), i.e., at the initial stage of manually opening operation, the first inclined cam surfaces 142a and 143a of the fixed cam 140 returned to the respective initial operation position and regulated from being rotated by the inclined guide portions 115 are respectively engaged with the cam portions 153 and 154 of the rotation cam 150 to have the movable case 120 retained at the closing position, i.e., the folded position while receiving the urging force to have the movable case 120 urged in the closing direction of the movable housing 30.

When the movable housing 30 is manually rotated with respect to the fixed housing 20 in the opening operation direction, the rotation cam 150 is moved to cause the compression spring 170 to be compressed from the original position and to slide over the top portions 142b and 143b of the cam portions 142 and 143 of the fixed cam 140 against the compression force of the compression spring 170 so that the urging direction of the compression spring 170 is changed toward the opening operation. This means that users of the mobile phone 10 feel operational resistance at the initial operation stage to open the movable housing 30, however, feel no operational resistance with the movable housing 30 since the movable housing 30 is arbitrarily opened after the movable housing 30 is opened to some extent of the opening operation.

Figure 12B:
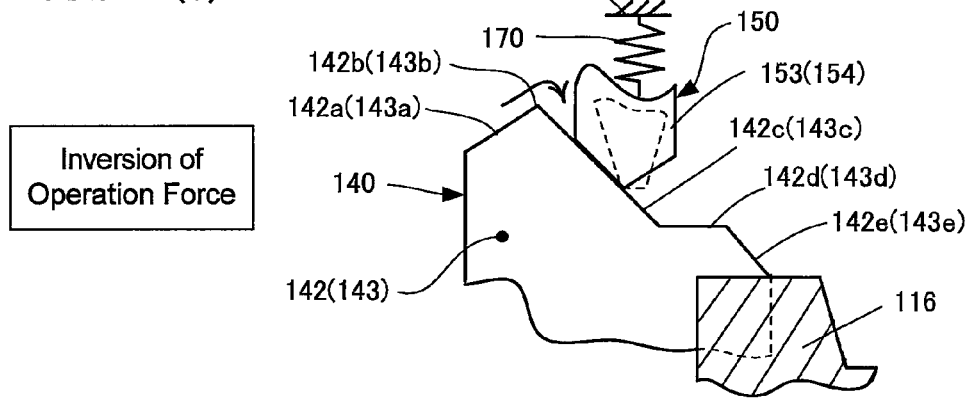
Figure 12C:
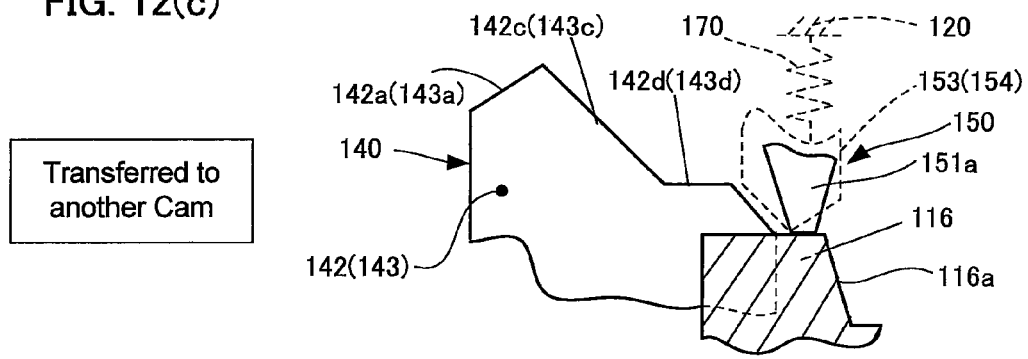

As the opening operation of the movable housing 30 advances with the movable housing 30 approaching to the predetermined opened position, the end surface positioning cam portion 151a of the rotation cam 150 is brought into engagement with the end portion of the cam support shaft portion 116 of the fixed case 110 so that the cam portions 153 and 154 of the rotation cam 150 regulated from being axially displaced is removed from the cam portions 142 and 143 of the fixed cam 140 to slide over the cam of the fixed case 110 as seen in FIG. 12(c).

Figure 12D:
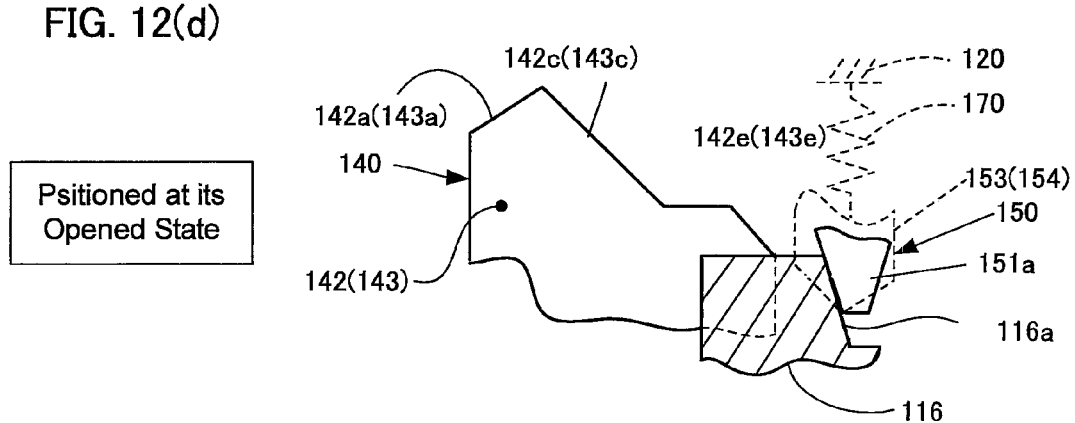

As the opening operation of the movable housing 30 advances further with the movable housing 30 reaching the predetermined opened position, the end surface positioning cam portion 151a is fallen into the end surface positioning cam portion 116a of the cam support shaft portion 116 of the fixed case 110 and positioned in the rotation direction so that the movable housing 30 is retained at the predetermined opened position with respect to the fixed housing 20 as shown in FIG. 12(d). At this time, the rotation cam 150 is imparted an urging force from the compression spring 170 so that the movable housing 30 can be opened with respect to the fixed housing 20 when receiving a torque more than a predetermined torque level, or otherwise is still maintained closed as long as the push button 25 to be described in detail hereinafter is not operated.

During the above-mentioned period of time, the fixed cam 140 is neither rotated nor axially displaced even only one time.

When the movable housing 30 is for example manually rotated with respect to the fixed housing 20 by a torque more than the predetermined torque level, the end surface positioning cam portion 151a of the rotation cam 150 is brought out of engagement with the end surface positioning cam portion 116a of the cam support shaft portion 116 of the fixed case 110. This results in the fact that the operation resistance abruptly becomes light for the user and that the rotation cam 150 is returned to the state shown in FIG. 12(c) from the state shown in FIG. 12(d). The rotation cam 150 is further returned to the state shown in FIG. 12(b) to have the cam portions 152 and 153 of the rotation cam 150 respectively engaged with the cam portions 142 and 143 of the fixed cam 140.

In the state, the operation resistance is increased as the movable housing 30 is rotated with respect to the fixed housing 20 in the closing direction, however, the operation resistance is abruptly decreased to have the movable housing 30 easily closed due to the fact that the urging direction is returned to the closing operation side when the cam portions 152 and 153 of the rotation cam 150 is moved while sliding over the top portions 142b and 143b of the cam portions 142 and 143 of the fixed cam 140 on the way to the state shown in FIG. 12(a) from the state shown in FIG. 12(b) of the cam portions 152 and 153 of the rotation cam 150. It will be understood from the foregoing description that the above operation makes it possible to perform the closing operation with an excellent operation feeling given to the users.

(Manual Opening Operation by Push Button)

Figure 13A:
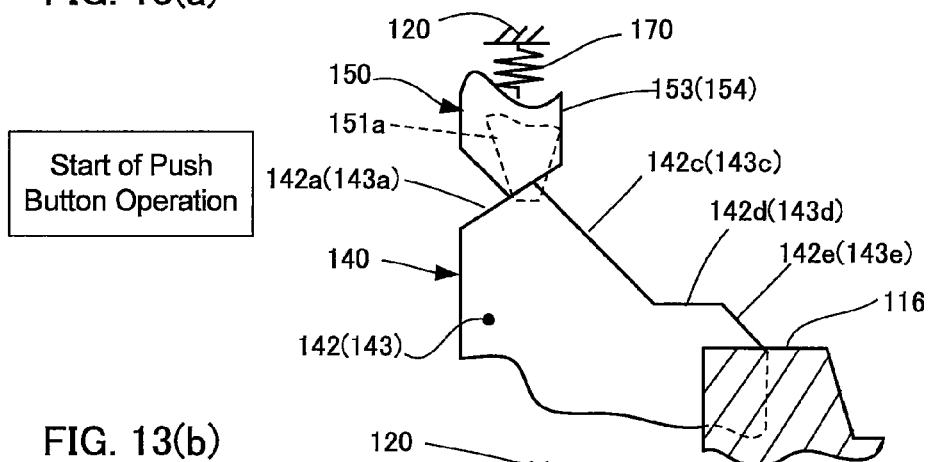
FIG. 13 shows schematic motion explanation views each showing a relative displacement of an essential cam only when the housing forming part of the mobile phone according to the first embodiment of the present invention is opened by the push button.

The following description will now be made to the case that the push button 25 is operated with the mobile phone 10 maintained in the folded state. Under this state, the initial state of the opening/closing hinge unit 100 is as shown in FIG. 4, and as shown in FIG. 13(a) when the states of the principal cams is schematically shown. This state in FIG. 13(a) is the same as the state in FIG. 12(a). In FIG. 13, the rightward movement of the rotation cam 150 indicates a closing operation of the mobile phone 10, and inversely the leftward movement of the rotation cam 150 represents an opening operation of the mobile phone 10.

In the initial state as shown in FIG. 13(a), i.e., the time to start operating the push button 25, the first inclined cam surfaces 142a and 143a of the fixed cam 140 returned to the operation starting position and regulated from rotating by the inclined guide portions 115 is held in engagement with the cam portions 153 and 154 of the rotation cam 150, and the movable case 120 is maintained at the closing position, i.e., the folded position while being urged in the closing operation direction of the housing 30.

When the push button 25 is then pushed by any one of fingers (for example thumb) of a single hand holding the fixed housing 20 of the mobile phone 10, the push cam 130 is axially moved along the guide center axis 110c to have the lock releasing cam 160 at the returned position driven to rotate. When the push button 25 is operated over the predetermined operation amount, the fixed cam 140 and the lock releasing cam 160 are brought into engagement with each other to make it possible for the fixed cam 140 to be fallen into the lock releasing cam 160 as shown in FIG. 14 in which the fixed cam 140 is displaced to the position shown by solid lines to the initial position shown in phantom lines.

Figure 13B:
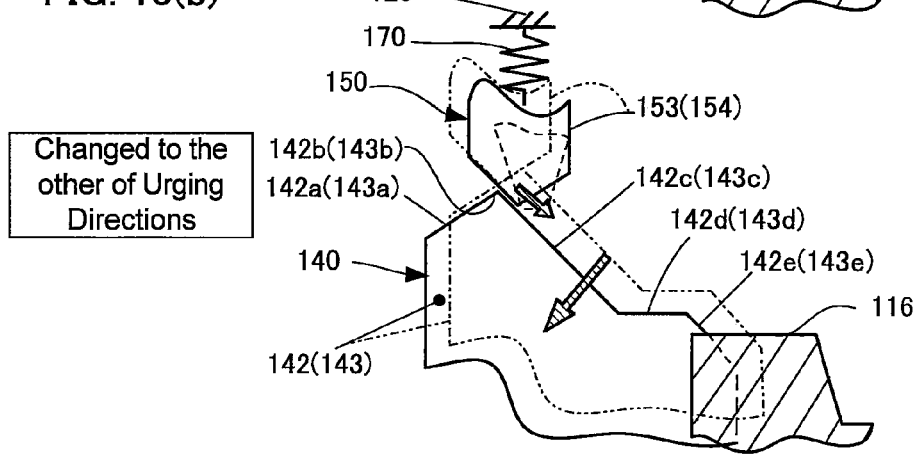
Figure 14:
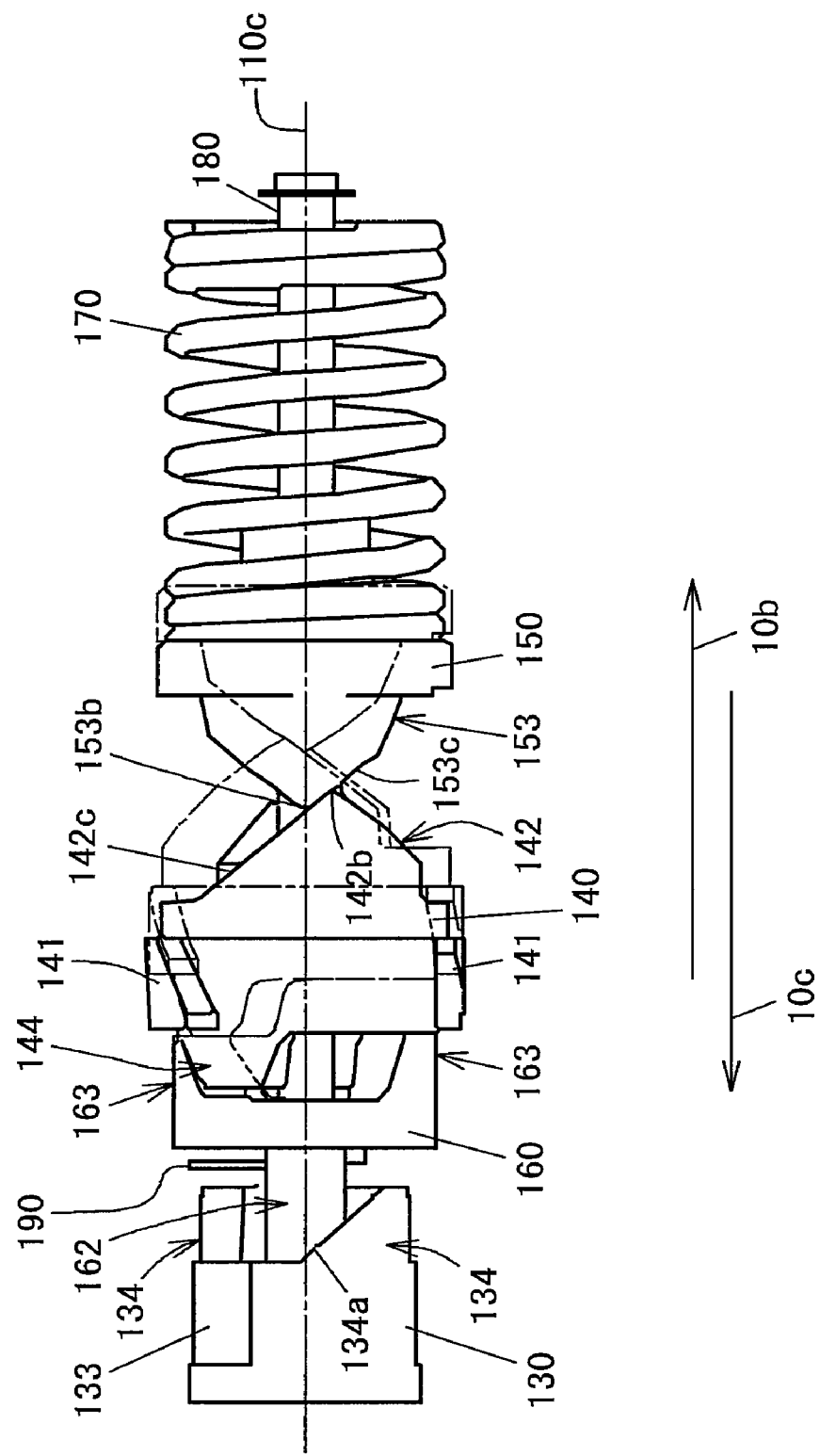
FIG. 14 is a motion explanation view showing relative displacements of essential cams in phantom lines in the initial operation of the push button shown in FIG. 13(*a*), and in solid lines in the released state of the fixed cam.

At this time, the fixed cam 140 is rotated around the guide center axis 110c while being guided by the inclined guide portions 115 and axially displaced so that the fixed cam 140 is helically moved with respect to the first inclined cam surfaces 153a and 154a of the cam portions 153 and 154 of the rotation cam 150 while receiving the axial urging force of the compression spring 170 through the rotation cam and concurrently receiving the relatively large rotation torque from the inclined guide portions 115 to have the urging direction changed toward the direction shown in FIGS. 13(b) and 14. The rotation torque (T) is indicated by a product (T=F×tan γ×r) of an axial thrust force (pressing force) generated at the engaged portions of the fixed cam 140 and the rotation cam 150, a tangent (tan γ) of the lead angle at the engaged portions of the fixed cam 140 and the rotation cam 150, and engagement radii (r).

After the urging direction is changed in the above operation, the cam portions 153 and 154 of the rotation cam 150 are fallen on the second inclined cam surfaces 142c and 143c of the cam portions 142 and 143 of the fixed cam 140, thereby making the movable case 120 and the movable housing 30 to arbitrarily become into the opened state.

Figure 13C:
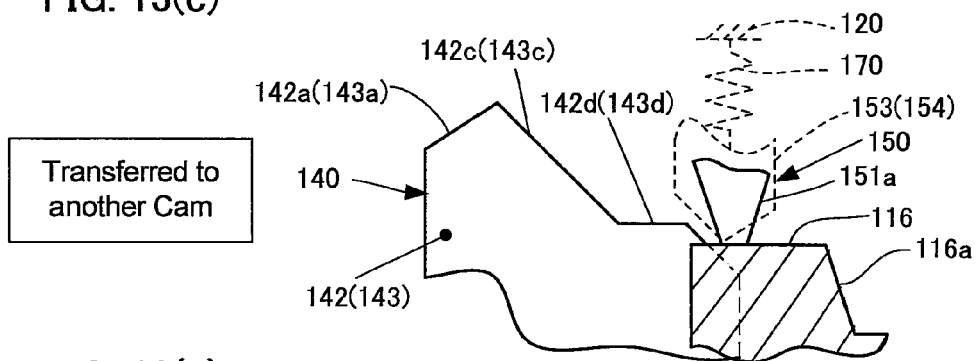
Figure 15:
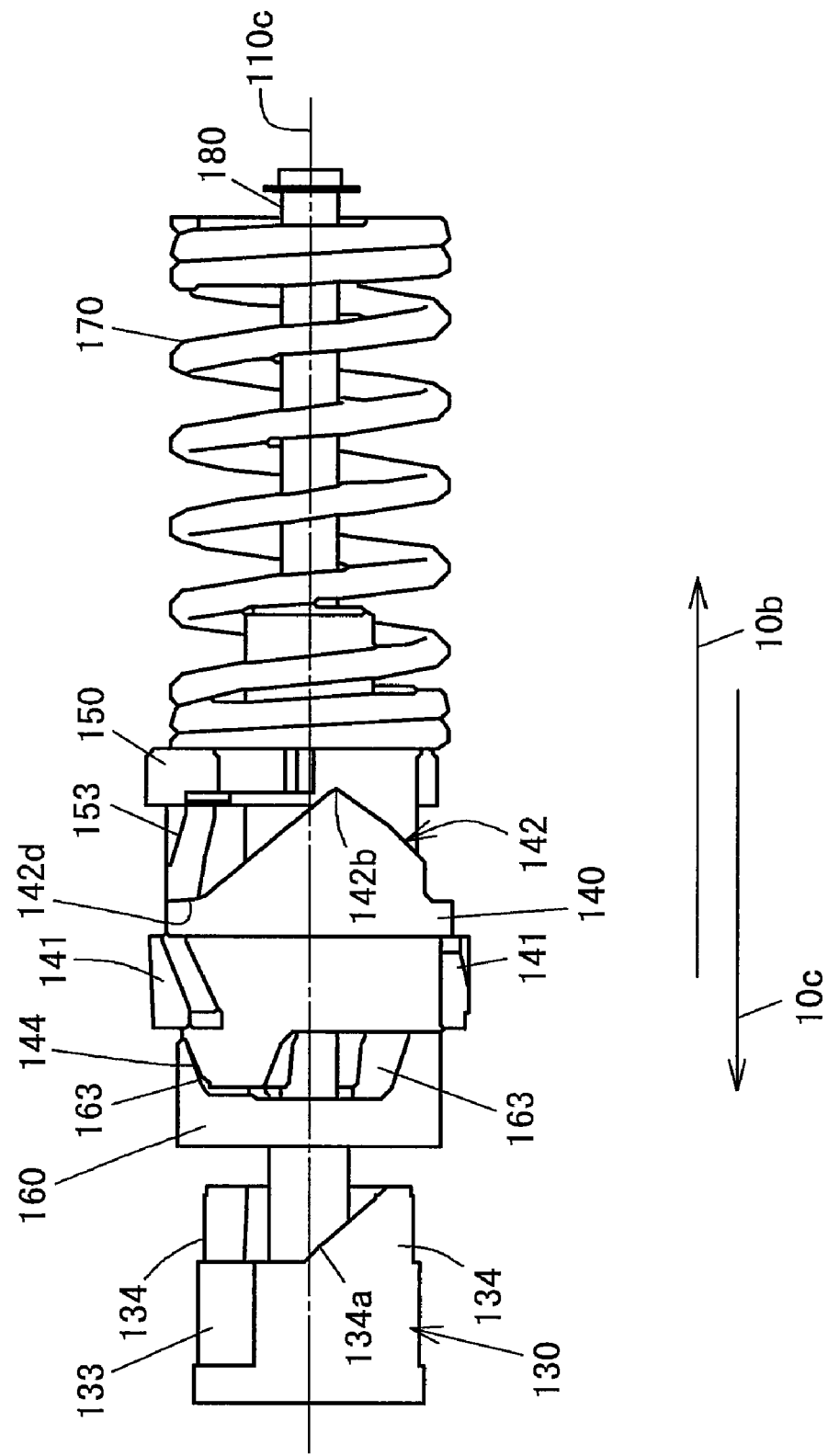
FIG. 15 is a motion explanation view showing relative displacements of essential cams after the initial operation of the push button shown in FIG. 13(*c*)

As the movable housing 30 continues to be opened and then approaches to the predetermined opened position, the end surface positioning cam portion 151a of the rotation cam 150 is brought into engagement with the end portion of the cam support shaft portion 116 of the fixed case 110 so that the cam portions 153, 154 of the rotation cam 150 regulated from being axially displaced is removed from the cam portions 142 and 143 of the fixed cam 140 to slide over the cam of the fixed case 110 as seen in FIG. 13(c) and FIG. 15.

Figure 13D:
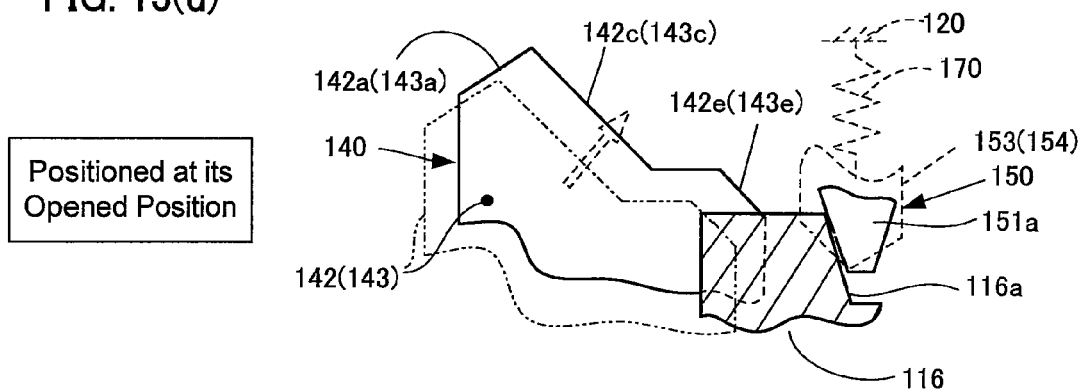
Figure 16:
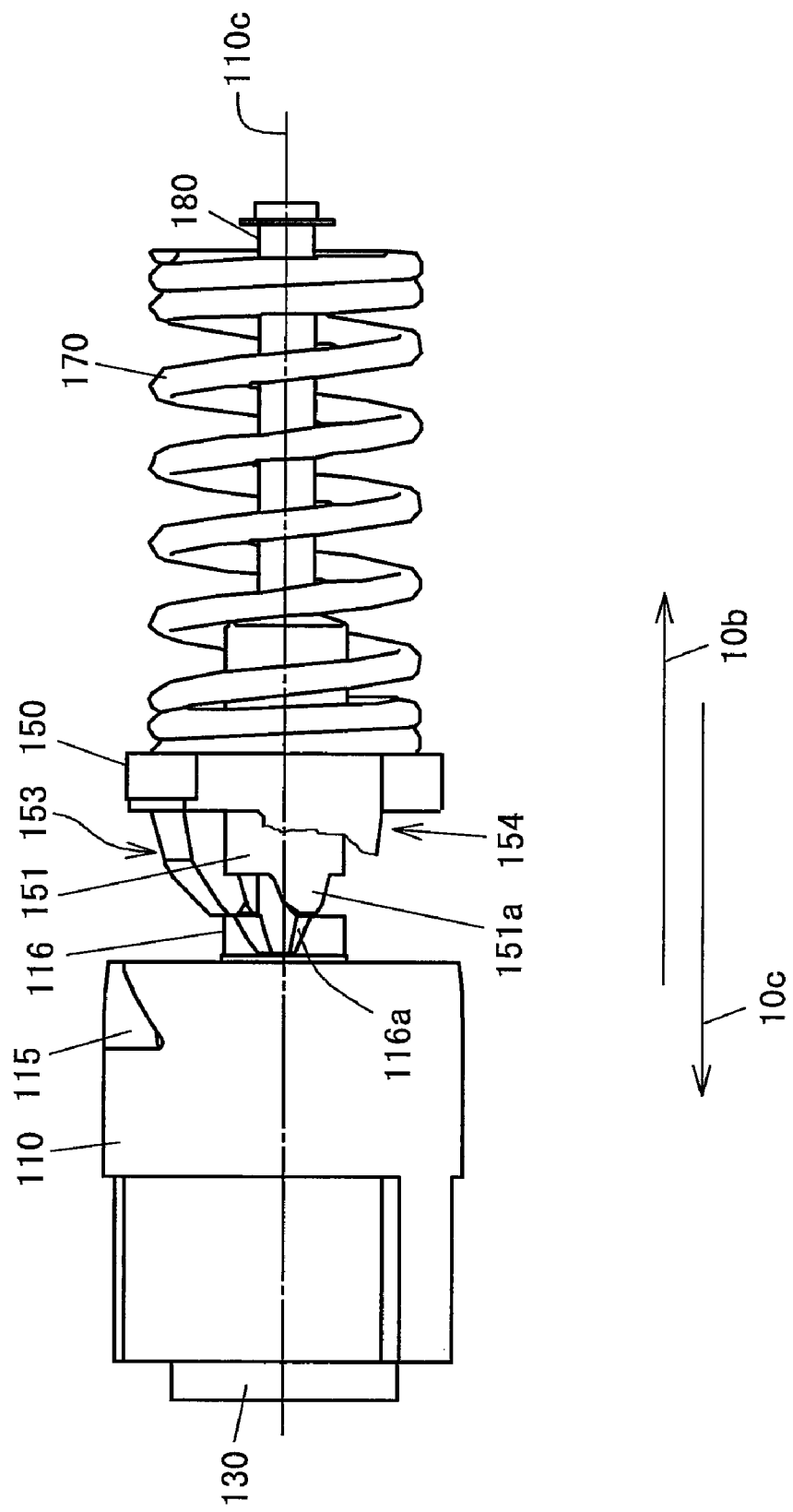
FIG. 16 is a motion explanation view showing relative displacements of essential cams in part fragmentally cross sectioned and showing the states of the positioning parts and elements from the stage of the cams engaged with one to others showed in FIG. 13(*c*) to the stage of the cams positioned in the opened state shown in FIG. 13(*d*)

When the opening operation of the movable housing 30 then advances further with the movable housing 30 reaching the predetermined opened position, the end surface positioning cam portion 151a of the rotation cam 150 is fallen into the end surface positioning cam portion 116a of the cam support shaft portion 116 of the fixed case 110 to be positioned in the rotation direction so that the movable housing 30 is maintained at the predetermined opened state with respect to the fixed housing 20 as seen in FIG. 13(d) and FIG. 16.

When, on the other hand, the operation force of the push button 25 is released, the returning torque of the returning spring 190 forces the lock releasing cam 160 to return to an initial operation starting position and forces the push cam 130 to move to an initial position. When the rotation cam 150 is moved to the state as shown in FIG. 13(d), the lock releasing cam 160 is moved to the operation starting position and the fixed cam 140 is also returned to the operation starting position due to the fact that the fixed cam 140 is pushed up by the releasing cam portions 163 of the lock releasing cam 160 with an lead angle smaller than that of the inclined guide portions 115.

It will be understood from the foregoing description that the above-mentioned returned state triggered by the operation of the push button 25 is the same as the state completed by the manual operation.

This means that the closing operation from the above-mentioned returned state is also the same as the state completed by the manual operation.

As will be understood from the foregoing description about the first embodiment, the rotation of the lock releasing cam 160 from the operation starting position by the operation of the push cam 130 causes the fixed cam 140 guided by the inclined guide portions 115 to be rotated while axially moving under the influence of the pressing force from the rotation cam 150 to ensure that the engaging state between the fixed cam 140 and the rotation cam 150 is changed to have the urging direction toward the movable housing 30 changed with the compression spring 170. Accordingly, there is no need for having the urging direction toward the movable housing 30 changed with other cams, thereby making it possible to reduce parts and elements partly constituting the mobile device. It is thus to be noted that the present invention can provide a small and light opening/closing device such as a opening/closing hinge unit 100 suitable for the mobile phone 10. The fixed cam 140 can smoothly be axially moved and rotated, thereby rendering it possible for the urging direction of the compression spring 170 to be changed.

Further, the rotation toque (T=F×tan γ×r) will here be considered. The urging direction changing cam portions 142 and 143 of the fixed cam 140 are engaged with the rotation cam 150 at engagement radii r1 and r2 smaller than the engagement radius r0 of the guide engagement portion 141 from the guide center axis 110c, thereby making it possible for the fixed cam 140 to be imparted a rotation torque sufficiently large with respect to the load torque of the urging direction changing cam portions 142 and 143 by the guide engagement portion 141 engaged with the inclined guide portions 115. This ensures that the urging direction changing operation can be performed. The fact that the lead angles γ2 of the first inclined cam surfaces 142a and 143a of the urging direction changing cam portions 142 and 143 are smaller than the lead angles γ1 of the inclined guide portions 115 of the fixed case 110 renders it possible for the fixed cam 140 to be imparted a rotation torque sufficiently large with respect to the load torque of the urging direction changing cam portions 142 and 143, so that the urging direction changing operation can be performed with certainty. Of course, it is possible that the urging direction changing cam portions 142 and 143 of the fixed cam 140 are engaged with the rotation cam 150 at engagement radii r1 and r2 (r1, r2<r0) smaller than that of the guide engagement portion 141 from the guide center axis 110c, or otherwise the above lead angles γ1 and γ2 are set as (γ1>γ2) to cause a torque for changing the urging direction.

In addition, the fixed case 110 is adapted to guide the lock releasing cam 160 and the fixed cam 140 through the cam support shaft portion 116 in the present embodiment of the present invention, thereby making it possible to guide the lock releasing cam 160 and the fixed cam 140 in a stable manner. Moreover, the present embodiment of the present invention enables the compression spring 170 to be accommodated in the movable case 120 mounted on the guide shaft 180, so that the essential elements and parts forming part of the opening/closing device can be mounted on the guide shaft 180, thereby making it possible to handle the opening/closing hinge unit 100 in a unit and thus easy to handle the opening/closing device. Furthermore, the present embodiment of the present invention enables the movable case 120 to have a function not only to retain the one of the compression spring 170 but also to axially guide the rotation cam 150, and additionally to be engaged with and rotated in unison with the movable housing 30.

In the above present embodiment of the present invention, the fixed cam 140 and rotation cam 150 are respectively provided with the urging direction changing outer cam portions 142 and 153 and the urging direction changing inner cam portions 143 and 154 different in engagement radius, the engaging states of the engaging portions of the fixed cam 140 and rotation cam 150 being changed in synchronism with each other and the urging direction of the compression spring 170 being also changed, so that the individual urging direction changing cam portions 142, 143, 153, and 154 can be provided with sufficient operation spaces, and the engaging cams can sufficiently secure minimum engagement angle ranges even with a plural kinds of the urging direction changing cam portions 142, 143, 153, and 154 provided in the opening/closing device. This makes it possible to lower the surface pressure of the engaged cam portions, thereby realizing to mold the fixed cam 140 and rotation cam 150 with, for example, materials excellent in moldability (such as for example molding resin and metal powder). The second inclined cam surfaces 142c and 143c inclined for performing the opening operation are properly curved or bent, thereby easily setting a speed reduction area 142d or an intermediate stop area.

In addition, the fixed case 110 and the rotation cam 150 respectively have end surface positioning cam portions 116a and 151a. The rotation cam 150 is disengaged from the fixed case 110 when being rotated nearly to the opened position. At this time, the end surface positioning cam portions 116a and 151a of the fixed case 110 and the rotation cam 150 are engaged with each other to have the movable housing 30 retained at the opened position so that the transferring operation to the positioning of the end surface positioning cam portions 116a and 151a from the engagement and disengagement of the fixed case 110 and the rotation cam 150 can easily be performed. The end surface positioning cam portions 116a and 151a arranged at the center portion of the opening/closing device make it possible to have the end surface positioning cam portions 116a and 151a reliably engaged with the fixed cam 140.

On the other hand, the mobile phone 10 exemplified in the above embodiment using the opening/closing hinge unit 100 can produce the hinge connection portion 11 small in size, light in weight, and at relatively low cost. Moreover, the hinge connection portion is excellent in durability and reliability.

Second Embodiment

FIG. 17 is a motion explanation view schematically showing operations of essential portions forming part of the opening/closing device according to the second embodiment of the present invention.

The second embodiment is almost the same in whole construction as the first embodiment but differs from the first embodiment in the aspect to the fact that the urging direction changing cam portions and the rotation cams engaged with the urging direction changing cam portions forming part of the first and second embodiment are different in shape from one another. For this reason, the following explanation will now be made with the same reference numerals as those appearing in FIGS. 1-16 about the constituting parts or elements of the second embodiment the same as those of the first embodiment.

As shown in FIG. 17(a), the second inclined cam surfaces 242c and 243c of the urging direction changing cam portions 242 and 243 of the fixed cam 240 in the second embodiment is different in shape from the second inclined cam surfaces 142c and 143c of the urging direction changing cam portions 142 and 143 of the fixed cam 140 in the first embodiment and thus has no intermediate speed reduction area 143d nor elongated inclined surface 143c. This means that the second inclined cam surfaces 242c and 243c of the urging direction changing cam portions 242 and 243 have no intermediate parts with small lead angles but have straight or slightly curved inclined surfaces. The cam portions 253 and 254 of the rotation cam 250, and the angle and shape of the inclined surface to be engaged with the second inclined cam surfaces 242c and 243c of the urging direction changing cam portions 242 and 243 are different from those counter parts forming part of the first embodiment. The fixed cam 240, the rotation cam 250 and the other construction of the second embodiment is entirely the same as those of the first embodiment.

The second embodiment of the present invention can obtain effects and advantages the same as those of the first embodiment of the present invention.

Third embodiment

FIG. 18 is a motion explanation view schematically showing operations of essential portions forming part of the opening/closing device according to the third embodiment of the present invention.

The opening/closing device according to the third embodiment is almost the same in whole construction as the opening/closing device according to the first embodiment but differs from the first embodiment in the aspect to the fact that the urging direction changing cam portions and the rotation cams engaged with the urging direction changing cam portions forming part of the first and second embodiment are different in shape from one another. For this reason, the following explanation will now be made with the same reference numerals as those appearing in FIGS. 1-16 about the constituting parts or elements of the second embodiment the same as those of the first embodiment.

As shown in FIG. 18(a), the second inclined cam surfaces 242c and 243c of the urging direction changing cam portions 242 and 243 of the fixed cam 240 in the second embodiment is different in shape from the second inclined cam surfaces 142c and 143c of the urging direction changing cam portions 142 and 143 of the fixed cam 140 extending from the top portions 142b and 143b in the first embodiment and have an intermediate stop areas 342d and 343d inclined toward the first inclined cam surfaces 342a and 343a connected with the elongated inclined surfaces 342e and 343e to form an inclined surface which is other than the speed reduction area 143d as seen in the first embodiment. The pair of cam portions 353 and 354 to be engaged with the urging direction changing cam portions 342 and 343 of the fixed cam 340 and the angle with the one side inclined surface to be engaged with the second inclined cam surfaces 342c and 343c of the urging direction changing cam portions 342 and 343 are different from those in the first and second embodiments. The other construction of the fixed cam 340 and the rotation cam 350 of the third embodiment is entirely the same as the fixed cam 140 and the rotation cam 150 of the first embodiment. The intermediate stop areas 342d and 343d and the elongated inclined surfaces 342e and 343e are necessarily not in a flat shape but may be in a curved shape. The cam surfaces near the intermediate stop areas 342d and 343d may not be bent but curved.

The third embodiment of the present invention can obtain the same effect as those of the first and second embodiments of the present invention. The urging direction changing cam portions 342 and 343 have respective intermediate stop areas 342d and 343d somewhat inclined oppositely to the second inclined cam surfaces 342c and 343c and the elongated inclined surfaces 342e and 343e, and have the shape of concave, thereby making it possible to temporarily stop the cam portions 353 and 354 at their intermediate portions so that the movable housing 30 is temporarily stopped at the position perpendicular to or slightly opened to the fixed housing 20. This can render the third embodiment versatile in the operation. In this case, the opening operation following the temporal stop of the movable housing 30 may be manually carried out or performed by the push button.

Further in the above embodiments, the mobile device has been explained using the mobile phone but may of course be applied to other devices such as PDA and other mobile devices. For the mobile device having a plurality of hinge connection portions spaced apart from each other, the hinge connection portions can be employed in such a manner that a plurality of opening/closing hinge units are arranged in axial alignment with each other are independently operated or are separately operated by an operation linkage to transmit operation forces to the units. In the above embodiment, the center axes of the opening/closing hinge units are arranged in axial alignment with those of the other opening/closing hinge units, but it may be considered that the center axes of the opening/closing hinge units are arranged in parallel while being offset from each other at offset amounts to allow the output of the movable case to be transmitted to other parts through proper transmitting tools like gears.

INDUSTRIAL AVAILABILITY OF THE PRESENT INVENTION

As explained in the foregoing description, the present invention can provide an opening/closing device small in size, light in weight and suitable as a mobile device by the reason that the rotation of the first rotation cam with the operation of the operation cam causes the second rotation cam guided by the inclined guide portion to be rotated while axially moving under the pressing force of the movable cam and thus to be changed in the engagement state with the movable cam, thereby making the urging direction of the second member changed with the urging means so that there is no need for other cams which cause the urging direction of the urging means to be changed, resulting in reducing the number of parts and elements to be assembled in the opening/closing device. The present invention is advantageous for the opening/closing device and all of the mobile devices using the same, the opening/closing device being provided with a function to open and close, only with a simple operation by the push button and the like, a hinge connection body of a foldable type having first and second members hingedly connected with each other.

The invention claimed is:

1. An opening/closing device comprising:
a fixed guide member (110) fixed to a first member (20) to be hingedly connected and having a guide center axis (10a) extending along a center axis of a hinge connection;
an operation cam (130) supported on said fixed guide member to be displaceable with respect to said fixed guide member in a predetermined operation direction by an external operation force;
a first rotation cam (160) rotatably supported on said fixed guide member to be engaged with said operation cam and to be rotated with respect to said fixed guide member around said guide center axis in response to the displacement of said operation cam;
a second rotation cam (140; 240; 340) supported on said fixed guide member to be displaceable along and rotatable around said guide cent axis in response to the rotation of said first rotation cam;
a movable cam (150; 250; 350) regulated from being rotated around said guide center axis with respect to a second member (30) hingedly connected with said first member, and positioned in face-to-face relationship with said second rotation cam and displaceable with respect to the fixed guide member along said guide center axis and rotatable around said guide center axis;
urging means (170) for urging said movable cam toward said second rotation cam in one of an opening operation direction (10e) to have said second member moved away from said first member and a closing operation direction (10d) to have said second member moved toward the first member in response to the engagement state of said second rotation cam and said movable cam, and
returning means (190) for returning said first rotation cam to a predetermined operation starting position of said operation cam and for returning said second rotation cam to a predetermined operation starting position where said second member is urged toward said closing operation direction by said urging means;
said second member being rotated with respect to said first member toward said opening operation direction through said movable cam by the urging force of said urging means when said operation cam is displaced in said predetermined operation direction by said external operation force, wherein
said fixed guide member having inclined guide portions (115) each inclined at an advance angle in a predetermined inclination direction with respect to the surface perpendicular to said guide center axis to have said second rotation cam rotated around said guide center axis in response to the displacement of said second rotation cam along said guide center axis, and
said second rotation cam being driven to rotate by said inclined guide portions under a pressing force from said movable cam to have its engagement state with said movable cam changed and to have the urging direction of the second member by said urging means changed when said operation cam is operated to cause the first rotation cam to be rotated from the operation starting position.

2. An opening/closing device as set forth in claim 1, in which each of said inclined guide portions is helically curved around said guide center axis.

3. An opening/closing device as set forth in claim 1, in which said second rotation cam has guide engagement portions (141) respectively engageable with said inclined guide portions at positions spaced apart at a predetermined distance from said guide center axis, and urging direction changing cam portions ((142, 143); (242, 243); (342, 343)) held in engagement with said movable cam at radiuses smaller than said predetermined distance from said guide center axis to have said urging direction of said second member by said urging means changed.

4. An opening/closing device as set forth in claim 1, in which said second rotation cam has urging direction changing cam portions held in engagement with said movable cam at predetermined radiuses from said guide center axis, said urging direction changing cam portions respectively having first inclined cam surfaces ((142a, 143a); (242a, 243a); (342a, 343a)) inclined in predetermined directions with respect to the surface perpendicular to said guide center axis to urge said movable cam toward the closing operation direction of said second member when said second member is positioned in the neighborhood of the closing operation position closest with said first member in the state of said second rotation cam returned to the predetermined operation starting position, second inclined cam surfaces ((142c, 143c); (242c, 243c); (342c, 343c)) inclined oppositely to said first inclined cam surfaces with respect to said surface perpendicular to said guide center axis, and top portions ((142b, 143b); (242b, 243b); (342b, 343b)) projected toward said movable cam between said first inclined cam surfaces and said second inclined cam surfaces to allow said urging direction of said second member to be changed by said urging means, said advance angle (γ2) of said first inclined cam surfaces being smaller than the advance angle (γ1) of said inclined guide portions of said fixed guide member.

5. An opening/closing device as set forth in claim 1, in which said fixed guide member has guide shaft portions (116, 180) in coaxial relationship thereof, said first rotation cam and said second rotation cam being guided by said guide shaft portion (116) in coaxial relationship with said fixed guide member.

6. An opening/closing device as set forth in claim 5, in which further comprises a bottomed cylindrical body supported on and coaxial with said guide shaft portion (180) and integrally engaged in rotation direction with said movable cam and said second member, said urging means being constituted by a resilient member (170) positioned between said bottomed cylindrical body and said movable cam.

7. An opening/closing device as set forth in claim 1, in which said second rotation cam and said movable cam respectively have a plurality of kinds of end cam portions (((142, 153); (242, 253); (342, 353)) and ((143, 154); (243, 254); (343, 354))) formed thereon at different radiuses from said guide center axis in opposing relationship with one another, said plurality of kinds of end cam portions including urging direction changing outer cam portions ((142, 153); (242, 253); (342, 353)) changed in engagement state while being axially pressed by said urging means to allow the urging direction of said second member to be changed when said operation cam is operated to cause the first rotation cam to be rotated from the predetermined operation starting position, and urging direction changing inner cam portions ((143, 154); (243, 254); (343, 354)) engaged with each other at respective positions closer to said guide center axis than said urging direction changing outer cam portions and changed in engagement state in synchronism with said urging direction changing outer cam portions while being axially pressed by said urging means to allow the urging direction of said second member to be changed when said operation cam is operated to cause the first rotation cam to be rotated from the predetermined operation starting position.

8. An opening/closing device as set forth in claim 1, in which said fixed guide member and said movable cam have respective end surface positioning cam portions (116*a*, 151*a*) axially opposing with each other, said movable cam being disengaged from said second rotation cam to have said end surface positioning cam portions of said fixed guide member and said movable cam engaged with each other and to have said second member positioned and retained at the opening position when said second member is moved to the opening position where said second member is remotest from said first member.

9. An opening/closing device as set forth in claim 8, in which said second rotation cam and said movable cam have respective end cam portions (((142, 143), (242, 243), (342, 343)), and ((153, 154); (253, 254); (353, 354))) formed thereon at different radiuses from said guide center axis in opposing relationship with one another, said end surface positioning cam portions (116*a*, 151*a*) of said fixed guide member and said movable cam are engaged with and disengaged from each other at the radius positions closer to said guide center axis than said end cam portions of said second rotation cam and said movable cam.

10. A mobile device using said opening/closing device as set forth in claim 1, said first member (20) and said second member (30) hingedly connected with each other collectively constitute an openable and closable housing of a foldable type.

* * * * *